United States Patent
Higashio et al.

(10) Patent No.: US 6,480,841 B1
(45) Date of Patent: Nov. 12, 2002

(54) INFORMATION PROCESSING APPARATUS CAPABLE OF AUTOMATICALLY SETTING DEGREE OF RELEVANCE BETWEEN KEYWORDS, KEYWORD ATTACHING METHOD AND KEYWORD AUTO-ATTACHING APPARATUS

(75) Inventors: Kimihiko Higashio, Kobe (JP); Takatoshi Mochizuki, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/157,413

(22) Filed: Sep. 21, 1998

(30) Foreign Application Priority Data

Sep. 22, 1997 (JP) .............................. 9-257025
Sep. 22, 1997 (JP) .............................. 9-257040

(51) Int. Cl.⁷ .............................................. G06F 17/30
(52) U.S. Cl. ................................ 707/4; 707/3; 707/529
(58) Field of Search .................................. 707/3, 4, 529

(56) References Cited

U.S. PATENT DOCUMENTS

| | | | | |
|---|---|---|---|---|
| 3,670,310 A | * | 6/1972 | Bharwani et al. ............... | 707/3 |
| 5,945,982 A | * | 8/1999 | Higashio et al. ............. | 345/203 |
| 6,070,161 A | * | 5/2000 | Higashio ........................ | 707/4 |
| 6,138,116 A | * | 10/2000 | Kitagawa et al. ............... | 707/5 |
| 6,330,576 B1 | * | 12/2001 | Mochizuki et al. ......... | 707/529 |

FOREIGN PATENT DOCUMENTS

| | | |
|---|---|---|
| JP | 60-157681 | 8/1985 |
| JP | 5-28266 | 2/1993 |
| JP | 5-274372 | 10/1993 |
| JP | 6-274193 | 9/1994 |
| JP | 6-295318 | 10/1994 |
| JP | 7-271949 | 10/1995 |
| JP | 8-16789 | 1/1996 |
| JP | 8-329096 | 12/1996 |

OTHER PUBLICATIONS

The Transaction of the Japanese Information Processing Society, vol. 33, No. 5.; May 1992 (in Japanese).
Fundamentals of Image Recognition (II); Apr. 20, 1998 (in Japanese).
Dr. Gupta,"Visual Information Retrieval Technology A Virage Perspective", Virage Image Engine API Specification, Feb. 1997.

* cited by examiner

*Primary Examiner*—Charles L. Rones
(74) *Attorney, Agent, or Firm*—Burns, Doane, Swecker & Mathis, LLP

(57) ABSTRACT

A retrieval apparatus allows keywords to be attached simply and automatically. A feature quantity extractor 15 extracts feature quantities of a registration-target image to obtain a p-dimensional feature vector. A vector converter 16 multiplies the p-dimensional feature vector with a canonical correlation coefficient matrix A2 so as to convert the feature vector into a k-dimensional feature composite variable vector, thus making a scale change. A keyword auto-setting processor 14 obtains q neighboring images based on distances between the feature composite variable vector of the registration-target image and coordinate composite variable vectors of r pre-registered images stored in a vector conversion coefficient storage 10. Then, based on distances between positions of the resulting q neighboring images on the image space and positions of the pre-registered keywords on the keyword space, h neighboring keywords are obtained for each of the neighboring images. Thus, q×h keywords suitably attached to the registration-target image are automatically set with simplicity.

32 Claims, 20 Drawing Sheets

Fig.6A

|  | KEYWORD | | | | | | | |
|---|---|---|---|---|---|---|---|---|
|  | C1 | C2 | C3 | ... | ... | ... | Cm−1 | Cm |
| IMAGE S1 | 1 | 0 | 0 |  |  |  | 0 | 1 |
| IMAGE S2 | 0 | 1 | 0 |  |  |  | 1 | 0 |
| IMAGE S3 | 0 | 0 | 1 |  |  |  | 0 | 0 |
| IMAGE S4 | 0 | 1 | 1 |  |  |  | 1 | 0 |
| IMAGE S5 | 0 | 1 | 1 |  |  |  | 0 | 0 |
| IMAGE S6 | 0 | 0 | 0 |  |  |  | 0 | 0 |
| IMAGE S7 | 1 | 1 | 0 |  |  |  | 0 | 0 |
| IMAGE S8 | 0 | 0 | 0 |  |  |  | 1 | 0 |
| IMAGE S9 | 0 | 1 | 0 |  |  |  | 0 | 1 |
| IMAGE S10 | 1 | 0 | 0 |  |  |  | 0 | 0 |
| ⋮ |  |  |  |  |  |  |  |  |
| IMAGE Sn-1 | 1 | 0 | 1 |  |  |  | 1 | 1 |
| IMAGE Sn | 0 | 1 | 0 |  |  |  | 0 | 0 |

Fig.6B

|  | KEYWORD | | | | | | | |
|---|---|---|---|---|---|---|---|---|
|  | C1 | C2 | C3 | ... | ... | ... | Cm−1 | Cm |
| IMAGE S1 | 2 | 1 | 1 |  |  |  | 0 | 4 |
| IMAGE S2 | 0 | 2 | 0 |  |  |  | 1 | 0 |
| IMAGE S3 | 0 | 3 | 1 |  |  |  | 1 | 0 |
| IMAGE S4 | 0 | 1 | 2 |  |  |  | 1 | 0 |
| IMAGE S5 | 0 | 1 | 1 |  |  |  | 0 | 3 |
| IMAGE S6 | 0 | 0 | 0 |  |  |  | 5 | 0 |
| IMAGE S7 | 1 | 2 | 0 |  |  |  | 0 | 6 |
| IMAGE S8 | 0 | 0 | 0 |  |  |  | 1 | 0 |
| IMAGE S9 | 0 | 7 | 0 |  |  |  | 0 | 2 |
| IMAGE S10 | 1 | 0 | 0 |  |  |  | 2 | 0 |
| ⋮ |  |  |  |  |  |  |  |  |
| IMAGE Sn-1 | 3 | 0 | 1 |  |  |  | 2 | 1 |
| IMAGE Sn | 0 | 1 | 0 |  |  |  | 0 | 0 |

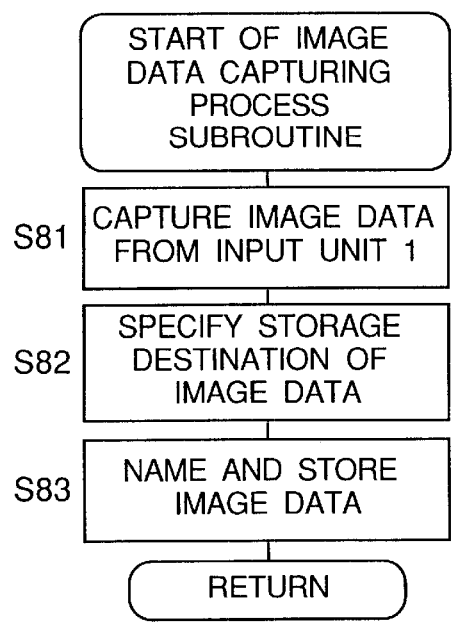
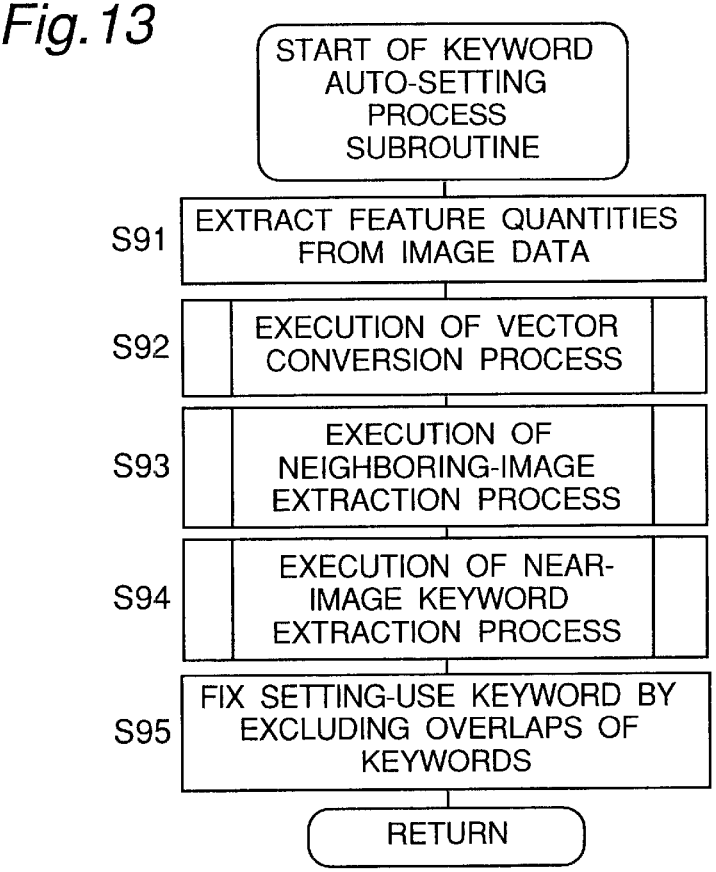

INFORMATION PROCESSING APPARATUS CAPABLE OF AUTOMATICALLY SETTING DEGREE OF RELEVANCE BETWEEN KEYWORDS, KEYWORD ATTACHING METHOD AND KEYWORD AUTO-ATTACHING APPARATUS

This application is based on applications Nos. 9-257025 and 9-257040 filed in Japan, the contents of which are hereby incorporated by reference.

BACKGROUND OF THE INVENTION

The present invention relates to an information processing apparatus capable of automatically setting the degree of relevance between keywords to be attached to objects, and also to a keyword attaching method for automatically attaching a keyword to an object to be registered in storage as well as a keyword auto-attaching apparatus using this keyword attaching method.

With the rapid popularization of computers, electronic information treated by people has been on a rapid increase in amount. These large volumes of electronic information are generally stored together with keywords, and specifying the keyword allows desired electronic information to be retrieved.

An example of the method for attaching a keyword to such electronic information is one disclosed in Japanese Patent Laid-Open Publication HEI 6-295318. In this keyword attaching method, the following procedure is taken, for example, to register image data of a human face picture with a keyword attached thereto.

Various. keyword candidates related to the human face, such as "long face" and "round face", are registered beforehand. Also, for each keyword candidate, goodness-of-fit calculating information and a threshold value to be used in calculating the goodness of fit are registered. For example, the goodness-of-fit calculating information for a keyword candidate of "long face" is "length-to-width ratio of profile". Next, one keyword candidate "long face" as well as the goodness-of-fit calculating information and threshold value associated with this keyword candidate "long face" are read out, and a goodness of fit is calculated based on the goodness-of-fit calculating information of the keyword candidate "long face" from feature quantities of image data of a target object to which a keyword is to be attached. Then, if the resulting goodness of fit is equal to or more than the threshold value of the keyword candidate "long face", the keyword candidate "long face" is determined as the keyword to be attached to the pertinent image data. From this on, similar operation is performed for all the registered keyword candidates, by which the keyword to be attached is determined.

In this way, an objective keyword attachment is achieved without relying on the subjective mind of the registering operator.

There has also been available another keyword attaching method as disclosed in Japanese Patent Laid-Open Publication HEI 8-329096. In this keyword attaching method, a two-dimensional keyword map having two axes such as comfort-discomfort and strong-weak is defined. Then, when a keyword is registered, the keyword to be registered is placed by manual operation at a point on the keyword map. With this arrangement, in an ambiguous retrieval of registered image data, specifying a distance from a specified keyword on the axes of the keyword map allows image data to be retrieved under a retrieval condition that keywords are located within the specified distance around the position of the specified keyword on the keyword map.

However, with the keyword attaching method described in the above Japanese Patent Laid-Open Publication HEI 6-295318, the degrees of relevance between every twos of all the keyword candidates are unknown. Therefore, there is a problem that when image retrieval is done, it is impossible to do an ambiguous retrieval that one keyword is specified and image retrieval is performed based on the specified keyword and similar keywords located in the neighborhood of the specified keyword. Further, the calculation of goodness of fit based on the goodness-of-fit calculating information and the comparison of threshold values must be iterated to the number of registered keyword candidates, taking much time for the work of registering image data as another problem. Moreover, suitable goodness-of-fit calculating information and threshold values need to be registered beforehand for individual keyword candidates, which would demand troublesome, difficult work in building a keyword attaching system although the keyword attaching work itself is done automatically.

Further, with the keyword attaching method described in the above Japanese Patent Laid-Open Publication HEI 8-329096, keywords can be positioned on one two-dimensional space, and the degree of relevance between keywords can be defined. Therefore, this method is effective for keyword selection in an ambiguous retrieval as described above. However, the correspondence between a keyword and image data to which this keyword should be attached is performed by persons. Also, the placement of keywords onto the keyword map must be done by manual operation as described above, which is very troublesome as a problem.

SUMMARY OF THE INVENTION

Accordingly, an object of the present invention is to provide an information processing apparatus which is capable of automatically setting the degree of relevance between keywords.

Another object of the present invention is to provide a keyword attaching method which allows a keyword to be attached simply and automatically, and a keyword auto-attaching apparatus using this keyword attaching method.

In order to achieve the above objects, the present invention provides an information processing apparatus in which an object is registered in storage with a keyword attached thereto, the apparatus comprising keyword space defining means for, based on a correspondence between a plurality of objects and a plurality of keywords attached to these objects, defining a keyword space for the plurality of keywords.

With this constitution, the keyword space having a scale set according to the correspondence between the plurality of objects and the plurality of keywords attached to these objects is defined. Therefore, a degree of relevance corresponding to a placement distance is set between every twos of the plurality of keywords placed on the keyword space. That is, according to this invention, degrees of relevance between keywords can be set automatically and efficiently so that the user can be freed from the troublesomeness in manually setting the degrees of relevance.

Furthermore, when a plurality of objects for acquisition of the above correspondence are set according to the field of use or the kind of use, a keyword space complying with the purpose can be built up.

Also, the present invention provides an information processing apparatus in which an object is registered in storage with a keyword attached thereto, the apparatus comprising object space defining means for, based on a correspondence between a plurality of objects and a plurality of keywords attached to these objects, defining an object space for the plurality of objects.

With this constitution, the object space having a scale set according to the correspondence between the plurality of objects and the plurality of attached keywords is defined. Therefore, a degree of relevance corresponding to a placement distance is set between every twos of the plurality of keywords placed on the keyword space. That is, according to this invention, degrees of relevance between keywords can be set automatically and efficiently so that the user can be freed from the troublesomeness in manually setting the degrees of relevance.

Furthermore, when a plurality of objects for acquisition of the above correspondence are set according to the field of use or the kind of use, an object space complying with the purpose can be built up.

An embodiment further comprises object space defining means for, based on the correspondence, defining an object space for the plurality of objects, wherein
the defined keyword space and object space are the same meaning space.

With this constitution, because the keyword space and the object space are of the same meaning space, a keyword placed at a position on the keyword space and an object placed at a position on the object space corresponding to the foregoing position have the same meaning. Therefore, a keyword suitable for an object is present in the neighborhood of the same position on the keyword space as the position of the object on the object space.

In an embodiment, the correspondence is obtained by mathematical quantification theory class III with each keyword used as a category and with each object used as a sample.

With this constitution, only giving an example of the object to which a keyword has been attached allows the keyword space and an object space having a high correlation to be defined. Then, each keyword is placed at a position on the keyword space according to the degrees of relevance with other keywords. Likewise, each object is placed at a position on the object space according to the degrees of relevance with other objects.

An embodiment further comprises keyword registering means for, based on a position of an object the position of which on the object space is known and which is corresponded to a registration-target keyword, determining the position of the registration-target keyword on the keyword space, and placing the registration-target keyword at the position on the keyword space.

With this constitution, only by associating with a registration-target keyword an object whose position on the object space has been known, the registration-target keyword is automatically placed at a proper position on the object space.

An embodiment further comprises keyword specifying means for specifying two keywords to be positioned at opposite poles; and
axis adding means for setting a new axis which interconnects the two specified keywords on the keyword space, and projecting all keywords already placed on the keyword space onto the set new axis to determine coordinates thereof on the new axis.

With this constitution, the new axis on the keyword space with which two keywords specified by the user are made to be positioned at both ends of a meaning scale is set. Thus, the new axis having a meaning understandable for the user is set on the keyword space.

Thus, in this information processing apparatus, two keywords to be positioned at opposite poles are specified by the keyword specifying means, and the new axis which connects the two keywords to each other is newly set on the keyword space by the axis adding means so that all the keywords already placed are projected onto the new axis. Thus, the new axis having a new evaluation scale specified by the user can be additionally set in the keyword space.

Furthermore, the present invention provides a computer program product in a memory which has stored therein a program for, based on a correspondence between a plurality of objects and a plurality of keywords attached to these objects, defining a keyword space for the plurality of keywords.

With this constitution, the keyword space having a scale set according to the correlation between the plurality of objects and the plurality of attached keywords is defined. Therefore, a degree of relevance corresponding to a placement distance is set between every twos of the plurality of keywords placed on the keyword space. That is, according to this invention, degrees of relevance between keywords can be set automatically and efficiently so that the user can be freed from the troublesomeness in manually setting the degrees of relevance.

Further, the present invention provides a computer program product in a memory which has stored therein a program for, based on a correspondence between a plurality of objects and a plurality of keywords attached to these objects, defining an object space for the plurality of objects.

With this constitution, the object space having a scale set according to the correspondence between the plurality of objects and the plurality of attached keywords is defined. Therefore, a degree of relevance corresponding to a placement distance is set between every twos of the plurality of objects placed on the object space.

A computer program product of an embodiment comprises a program stored therein for defining an object space for the plurality of objects, which is the same meaning space as the defined keyword space, based on the correspondence.

With this constitution, because the keyword space and the object space is of the same meaning space, a keyword placed at a position on the keyword space and an object placed at a position on the object space corresponding to the foregoing position have the same meaning. Therefore, a keyword suitable for one object is present in the neighborhood of the same position on the keyword space as the position of the object on the object space.

In an embodiment, the correspondence is obtained by mathematical quantification theory class III with each keyword used as a category and with each object used as a sample.

With this constitution, only by giving an example of the object to which a keyword has been attached, the keyword space and the object space having a high correlation is defined. Then, each keyword is placed at a position on the keyword space according to the degrees of relevance with other keywords. Likewise, each object is placed at a position on the object space according to the degrees of relevance with other objects.

A computer program product of an embodiment comprises a program stored therein for, based on a position of an object the position of which on the object space is known and which is corresponded to a registration-target keyword, determining the position of the registration-target keyword on the keyword space, and positioning the registration-target keyword at the position on the keyword space.

With this constitution, only by associating with a registration-target keyword an object whose position on the object space has been known, the registration-target keyword is automatically placed at a proper position on the object space.

A computer program product of an embodiment comprises a program for setting on the keyword space a new axis which interconnects two specified keywords to be positioned at opposite poles with each other, and projecting all keywords already placed on the keyword space onto the set new axis to determine coordinates thereof on the new axis.

With this constitution, the new axis on the keyword space with which two keywords specified by the user are made to be positioned at both ends of a meaning scale is set. Thus, the new axis having a meaning understandable for the user is set on the keyword space.

The present invention also provides a keyword attaching method for automatically attaching a keyword to an object to be registered in storage, comprising
- preparing a two- or more-dimensional meaning space in which a plurality of objects and keywords attached to these objects are placed;
- extracting feature quantities of a registration-target object;
- determining a position of the registration-target object on the meaning space based on the feature quantities; and
- selecting a keyword positioned in a neighborhood of the position of the registration-target object and attaching the keyword to the registration-target object.

With this constitution, the two- or more-dimensional meaning space in which a plurality of objects and keywords attached to these objects are placed can be obtained easily by a multivariate analysis of mathematical quantification theory class III or the like. Therefore, only by giving examples of a plurality of objects to which keywords have been attached, a keyword suitable for a registration-target object is selected and attached easily and automatically. Therefore, the user can be freed from very troublesome work of selecting and attaching a suitable keyword in the registration of an object, so that the object registering work can be achieved efficiently.

Further, with the preparation of a meaning space in which a plurality of objects and keywords attached to these objects are placed, according to the field of use or the kind of use, a suitable keyword can be attached according to the field of use or the kind of use.

An embodiment further comprises performing a canonical correlation analysis on positions on the meaning space and feature quantities relating to a plurality of objects, thereby determining a correlation between the positions on the meaning space and the feature quantities relating to the plurality of objects; and
- determining the position of the registration-target object on the meaning space based on the feature quantities of the registration-target object by using the correlation.

With this constitution, by using the correlation between positions on the meaning space and feature quantities relating to the plurality of objects acquired by canonical correlation analysis, the correct position of the registration-target object on the meaning space is determined based on the feature quantities of the registration-target object. Thus, a keyword more suitable for the registration-target object can be attached.

In a method of an embodiment, the meaning space is divisionally prepared in an object-use meaning space in which the plurality of objects are placed, and a keyword-use meaning space which has the same spatial structure as the object-use meaning space and in which the keywords attached to the plurality of objects are placed, the method further comprising;
- selecting n (n: integer) objects positioned in a neighborhood of the position of the registration-target object on the object-use meaning space; and
- selecting a keyword positioned in a neighborhood of the registration-target object based on the positions of the individual n selected objects on the object-use meaning space and by using the keyword-use meaning space.

With this constitution, by using the object-use meaning space and the keyword-use meaning space having the same spatial structure, a keyword positioned in the neighborhood of the position of the registration-target object is easily selected.

In a method of an embodiment, the meaning space is divisionally prepared in an object-use meaning space in which the plurality of objects are placed, and a keyword-use meaning space which has the same spatial structure as the object-use meaning space and in which the keywords attached to the plurality of objects are placed, the method further comprising:
- selecting n objects positioned in a neighborhood of the position of the registration-target object on the object-use meaning space;
- determining a focused position on the object-use meaning space based on the positions of the selected n objects on the object-use meaning space; and
- selecting a keyword positioned in a neighborhood of the registration-target object based on the focused positions and by using the keyword-use meaning space.

With this constitution, by using the object-use meaning space and the keyword-use meaning space having the same spatial structure, a keyword positioned in the neighborhood of the position of the registration-target object is easily selected.

Further, the present invention provides a keyword auto-attaching apparatus for automatically attaching a keyword to an object to be registered in storage, comprising:
- meaning space storing means in which information as to a two- or more-dimensional meaning space in which a plurality of objects and keywords attached to these objects are placed is stored;
- feature quantity extracting means for extracting feature quantities of a registration-target object;
- object position calculating means for, based on the feature quantities, determining a position of the registration-target object on the meaning space;
- keyword selecting means for selecting keywords positioned in a neighborhood of the position of the registration-target object out of the keywords placed on the meaning space; and
- keyword attaching means for attaching the selected keywords to the registration-target object.

With this constitution, the two- or more-dimensional meaning space to be stored in the meaning space storage can be easily obtained based on the plurality of objects and keywords attached to these objects by a multivariate analysis of mathematical quantification theory class III or the like. Therefore, only by preparing a plurality of objects to which keywords have been attached, and based on the position of a registration-target object on the meaning space, a keyword suitable for the registration-target object is selected easily and automatically from among the keywords placed on the meaning space. As a result, the user can be freed from very troublesome work of selecting and attaching a suitable keyword in the registration of an object, so that the object registering work can be achieved efficiently.

Further, when information as to the meaning space in which a plurality of objects and keywords attached to these objects according to the field of use or the kind of use have been stored is stored in the meaning space storage means, then a suitable keyword according to the field of use or the kind of use can be attached.

An embodiment further comprises correlation calculating means for performing a canonical correlation analysis on positions on the meaning space and feature quantities relating to a plurality of objects, thereby determining a correlation between positions on the meaning space and feature quantities relating to the plurality of objects, wherein the object position calculating means determines the position of the registration-target object on the meaning space based on the feature quantities of the registration-target object, by using the correlation.

With this constitution, by using the correlation between positions on the meaning space and feature quantities relating to the plurality of objects acquired by canonical correlation analysis, and based on the feature quantities of a registration-target object, the correct position of the registration-target object on the meaning space can be determined. As a result, a keyword more suitable for the registration-target object can be attached.

In an embodiment, information as to the meaning space is divisionally stored in an object-use meaning space in which the plurality of objects are placed, and a keyword-use meaning space which has the same spatial structure as the object-use meaning space and in which the keywords attached to the plurality of objects are placed, and wherein the keyword selecting means comprises:

neighboring object extracting means for extracting n (n: integer) objects positioned in a neighborhood of the position of the registration-target object on the object-use meaning space; and neighboring keyword extracting means for extracting keywords positioned in a neighborhood of the registration-target object based on the positions of the individual n extracted objects on the object-use meaning space, and by using the keyword-use meaning space.

With this constitution, by associating the object-use meaning space and the keyword-oriented meaning space having the same spatial structure with each other, a keyword positioned in the neighborhood of the position of the registration-target object can be easily selected.

In an embodiment, information as to the meaning space is divisionally stored in an object-use meaning space in which the plurality of objects are placed, and a keyword-use meaning space which has the same spatial structure as the object-use meaning space and in which the keywords attached to the plurality of objects are placed, and wherein the keyword selecting means comprises:

neighboring object extracting means for extracting n objects positioned in a neighborhood of the position of the registration-target object on the object-use meaning space;

focused position calculating means for determining a focused position on the object-use meaning space based on the positions of the extracted n objects on the object-use meaning space; and neighboring keyword extracting means for extracting keywords positioned in a neighborhood of the registration-target object based on the focused positions and by using the keyword-use meaning space.

With this constitution, by associating the object-use meaning space and the keyword-use meaning space having the same spatial structure with each other, a keyword positioned in the neighborhood of the position of the registration-target object can be easily selected.

The present invention also provides a computer program product in a memory, comprising a program for extracting feature quantities of a registration-target object;

determining, based on the feature quantities, a position of the registration-target object on a two- or more-dimensional meaning space in which a plurality of objects and keywords attached to these objects are placed; and selecting keywords positioned in a neighborhood of the position of the registration-target object out of the keywords placed on the meaning space, and attaching the keywords to the registration-target object.

With this constitution, the position of a registration-target object in the meaning space in which a plurality of objects and keywords attached to these objects have been placed is determined based on the feature quantities of the registration-target object. As a result, a keyword positioned in the neighborhood of the position of the registration-target object on the meaning space can be easily obtained as a keyword suitable for the registration-target object.

A computer program product of an embodiment comprises a program for performing a canonical correlation analysis on positions on the meaning space and feature quantities relating to a plurality of objects, thereby determining a correlation between positions on the meaning space and feature quantities relating to the plurality of objects; and determining the position of the registration-target object on the meaning space based on the feature quantities of the registration-target object, by using the correlation.

With this constitution, when the position of the registration-target object on the meaning space is determined based on the feature quantities of the registration-target object, the correlation acquired by canonical correlation analysis is used. Thus, based on the feature quantities of the registration-target object, the correct position of the registration-target object on the meaning space is determined.

It is noted here that the term "object" refers to electronic information (for example, text data or image data or audio data) which should be the major body to be saved by an information processing apparatus like the present retrieval apparatus, or to holders or the like into which those data have been integrated.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 6A and 6B are explanatory charts of sample data;

FIG. 12 is a flow chart of an image data capturing process subroutine to be executed during the image data registration process shown in FIG. 11;

FIG. 13 is a flow chart of a keyword auto-setting process subroutine to be executed during the image data registration process shown in FIG. 11;

DETAILED DESCRIPTION OF THE PREFERRED EMBODIMENTS

Hereinbelow, the present invention is described in more detail by embodiments thereof illustrated in the accompanying drawings.

Figure 1:
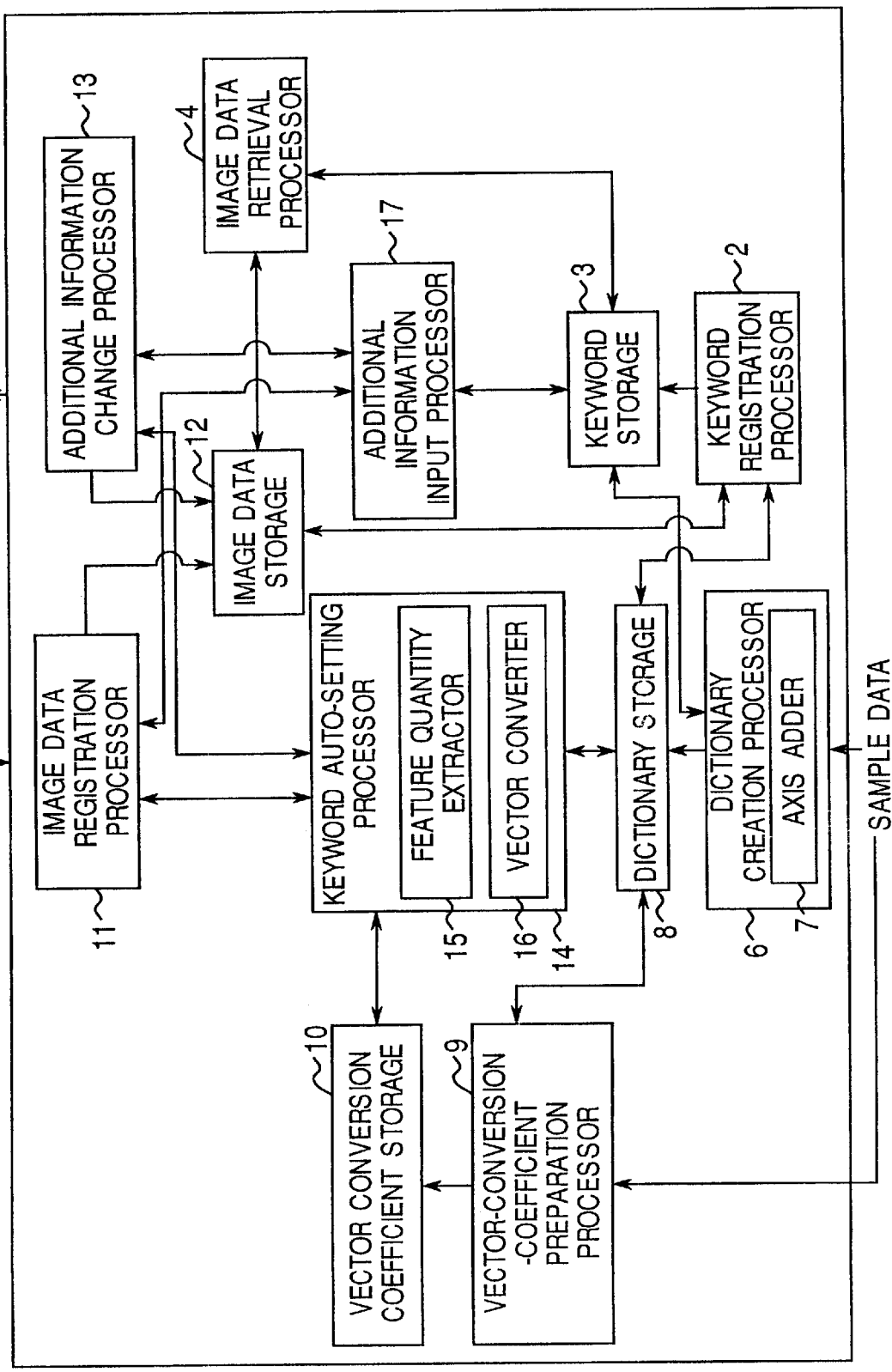
FIG. 1 is a functional block diagram of a retrieval apparatus as an information processing apparatus equipped with a keyword auto-attaching apparatus according to the present invention.

FIG. 1 is a functional block diagram of a retrieval apparatus as one example of an information processing apparatus according to the present invention. In this embodiment, image data is used as the "object".

Image data, retrieval conditions, various instructions and the like to be stored in an image data storage 12 are inputted from an input unit 1. A keyword registration processor 2 registers a keyword which is one retrieval condition inputted from the input unit 1, and its coordinates on a keyword space, as they are associated with each other, into a keyword storage 3. Taking the keyword set from the input unit 1 as a retrieval condition, an image data retrieval processor 4 retrieves image data fitting to the retrieval condition from among the image data stored in the image data storage 12. Then, a candidate image is displayed on a display unit 5 based on the retrieved image data.

A dictionary creation processor 6 builds up an image dictionary and a keyword dictionary in a manner detailed later based on sample data showing how keywords are attached to exemplary images, and stores the dictionaries into a dictionary storage 8. In attachment, an axis adder 7 adds a new axis to each built-up dictionary. A vector-conversion-coefficient preparation processor 9 determines a coefficient matrix A1 to be used in converting an n-dimensional coordinate vector of an image on the image dictionary into a k-dimensional composite variable vector "f", and a coefficient matrix A2 to be used in converting a p-dimensional feature vector of an image into a k-dimensional composite variable vector "g", and stores the determined matrices into a vector conversion coefficient storage 10.

A keyword auto-setting processor 14 converts a p-dimensional feature vector of a registration-target image extracted by a feature quantity extractor 15 into a k-dimensional composite variable vector "g" by a vector converter 16. Then, a neighboring image of the registration-target image is obtained from the comparison between the k-dimensional composite variable vector "g" and a k-dimensional composite variable vector "f" obtained by converting the n-dimensional coordinates vectors on the image dictionary of all the images registered in the image data storage 12. Further, based on the coordinate vector of this neighboring image on the image dictionary, a keyword suitable for the registration-target image is set as described in detail later. An additional information input processor 17 is used to manually input keywords and other additional information.

An image data registration processor 11 controls the keyword auto-setting processor 14 and the additional information input processor 17 so as to automatically or manually attach a keyword to the image data inputted from the input unit 1, thus making the image data registered in the image data storage 12. Moreover, an additional information change processor 13 controls the keyword auto-setting processor 14 and the additional information input processor 17 so as to automatically or manually change the keyword attached to a change-target image data, thus updating the image data storage 12.

Figure 2:
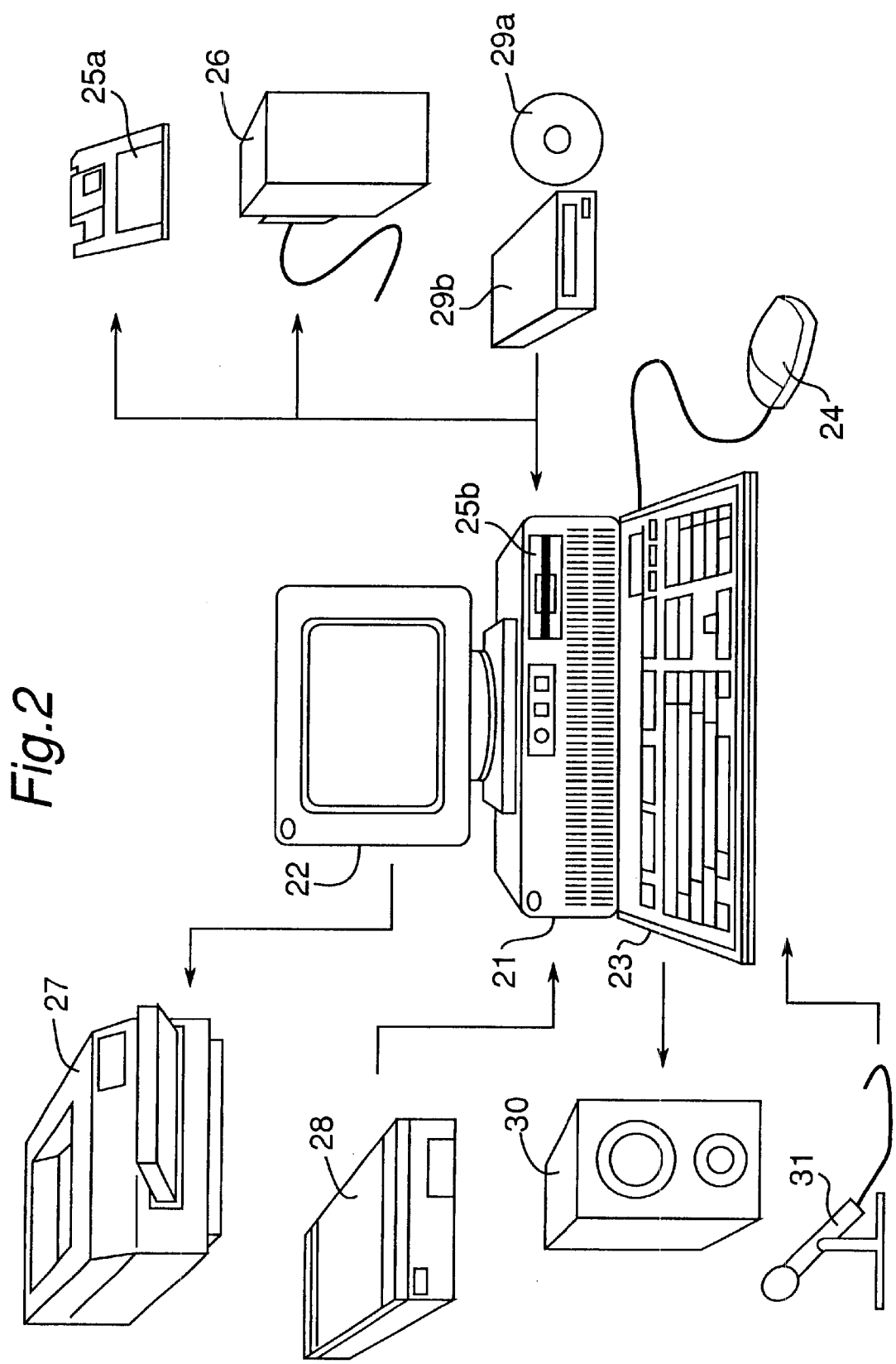
FIG. 2 is a view showing an apparatus configuration for implementing the functions shown in FIG. 1.
Figure 3:
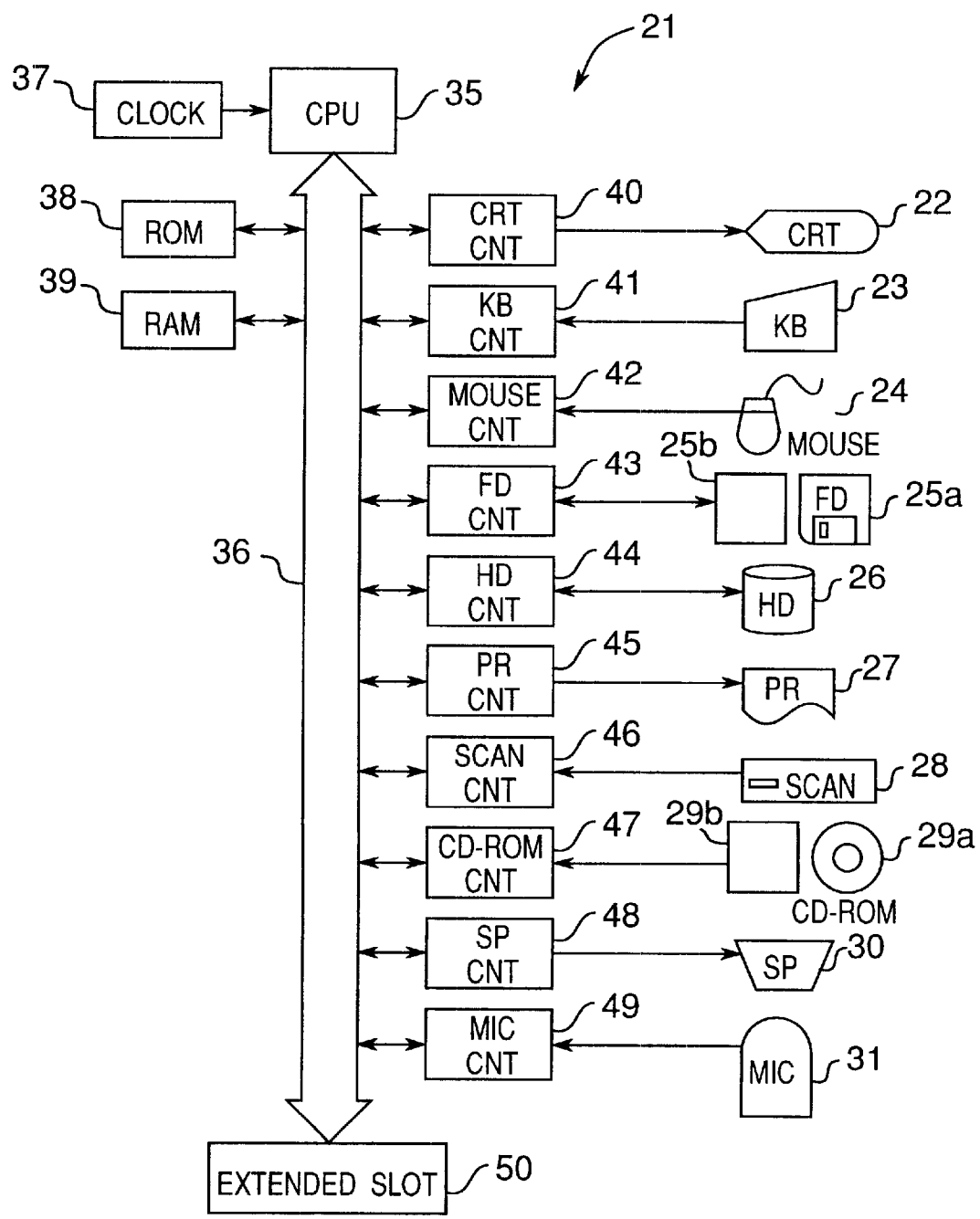
FIG. 3 is a block diagram centered on a CPU of the hardware for implementing the functions shown in FIG. 1.

FIGS. 2 and 3 are views showing hardware configuration for implementing the functions of FIG. 1. This retrieval apparatus, as shown in FIG. 2, comprises a control unit 21 for controlling the operation of the whole retrieval apparatus with a CPU (Central Processing Unit) mounted, and around this control unit 21, a CRT (Cathode Ray Tube) 22, a keyboard 23, a mouse 24, a floppy disk drive 25b, a hard disk drive 26, a printer 27, a scanner 28, a CD-ROM drive 29b, a loudspeaker 30, a microphone 31 and the like.

A retrieved image and various information, such as character information, necessary for operation are displayed on the CRT 22. The keyboard 23 and the mouse 24 are used for various input operations and instruction operations. A floppy disk 25a is loaded to the floppy disk drive 25b of the control unit 21 so that stored data is reproduced. The hard disk drive 26 stores image data and keywords. The printer 27 prints out an image based on the image data, drawings prepared by image compilation or the like onto paper. The scanner 28 reads an image on a document sheet to output image data. The CD-ROM 29a, in which image data has been stored in a specified format, is loaded to the CD-ROM drive 29b so that image data is reproduced. The loudspeaker 30 serves for speech output, while the microphone 31 serves for speech input. In this arrangement, image data read by the scanner 28 and the CD-ROM drive 29b is stored in the hard disk drive 26. In addition, the scanner 28, the CD-ROM drive 29b, the loudspeaker 30 and the microphone 31 may also be built in the control unit 21 integrally.

FIG. 3 represents FIG. 2 in a block diagram centered on the CPU mounted on the control unit 21. As the CPU 35, for example, product number i80486DX made by Intel Corp. is used. Then, to the CPU 35, are connected via a data bus 36, a ROM (Read Only Memory) 38 in which programs for controlling the retrieval apparatus are stored, a RAM (Random Access Memory) 39 in which various data and programs are stored, a display control circuit 40 for displaying images or characters or the like onto the CRT 22, a keyboard control circuit 41 for controlling the transmission of inputs from the keyboard 23, a mouse control circuit 42 for controlling the transmission of inputs from the mouse 24, a floppy disk drive control circuit 43 for controlling the floppy disk drive 25b, a hard disk control circuit 44 for controlling the hard disk drive 26, a printer control circuit 45 for controlling the output operation of the printer 27, a scanner control circuit 46 for controlling the image input operation of the scanner 28, a CD-ROM drive control circuit 47 for controlling the CD-ROM drive 29b, a loudspeaker controller 48 for controlling the speech output of the loudspeaker 30, and a microphone control circuit 49 for controlling the speech input from the microphone 31.

Also to the CPU 35, a clock 37 for generating a reference clock necessary for operation of this retrieval apparatus is connected, and further an extended slot 50 for connecting various extended boards is connected via the data bus 36. In addition, it is also possible that a SCSI board is connected to the extended slot 50 so that the floppy disk drive 25b, the hard disk drive 26, the scanner 26, the CD-ROM drive 29b and the like may be connected thereto via this SCSI board.

That is, in this embodiment, the input unit 1 is implemented by the keyboard 23, the mouse 24, the hard disk drive 26, the scanner 28 and the CD-ROM drive 29b. The image data storage 6 and the dictionary storage 8 are implemented by the floppy disk 25a and the hard disk drive 26 and the like. The keyword storage 3 and the vector conversion coefficient storage 10 are implemented by the RAM 39 and the like. The display unit 5 is implemented by the CRT 22. The keyword registration processor 2, the image data retrieval processor 4, the dictionary creation processor 6, the vector-conversion-coefficient preparation processor 9, the image data registration processor 11, the additional information change processor 13, the keyword auto-setting processor 14 and the additional information input processor 17 are implemented by the CPU 35.

In this embodiment, the image data storage 12 is implemented by the floppy disk 25a and the hard disk drive 26 as described above. However, other storage media such as magneto-optical disk devices may also be used. Also, although input part for image data out of the input unit 1 is implemented by the hard disk drive 26, the scanner 28 and the CD-ROM drive 29b, other input devices such as a still video camera or a digital camera may also be used. Still also, other output devices such as a digital copying machine may also be used instead of the printer 27.

Also in this retrieval apparatus, programs for the keyword registration process, the dictionary creation process, the vector conversion coefficient preparation process, the keyword auto-setting process, the additional information input process, the image data registration process, the additional information change process, the image data retrieval process and the like are stored in the ROM 38. However, it is also possible that the programs are partly or entirely stored in external storage media such as the floppy disk 25a and the hard disk drive 26, and read to the RAM 39 as required.

The retrieval apparatus having the above constitution operates as follows.

Figure 4:
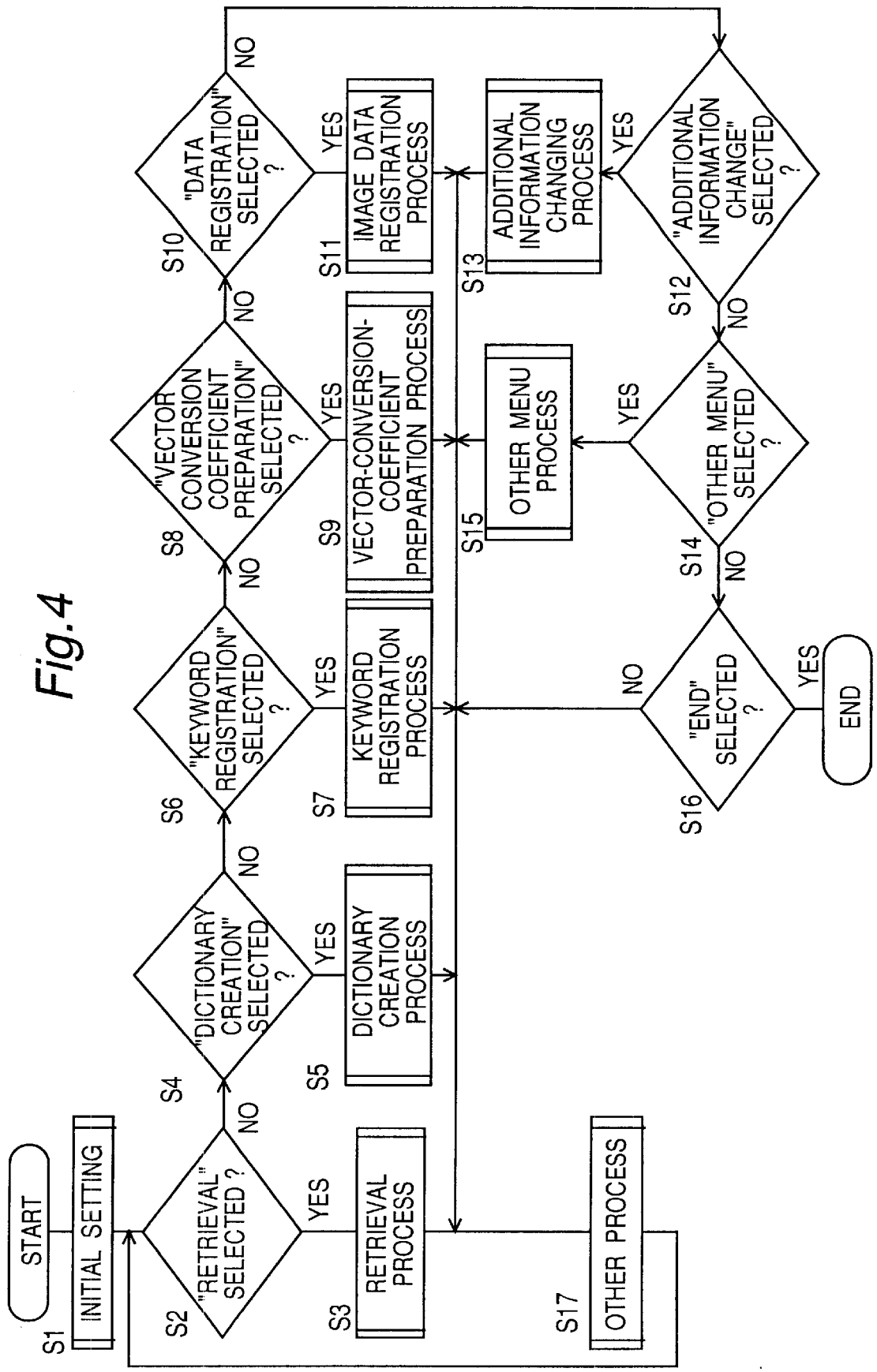
FIG. 4 is a flow chart of basic process operation to be executed under the control of the CPU in FIG. 3.

FIG. 4 is a flow chart of basic process operation to be executed under the control of the CPU 35 based on the program stored in the ROM 38. Hereinbelow, the basic process operation of this retrieval apparatus is explained with reference to FIGS. 1 and 4.

When the program is started up with the retrieval apparatus powered on, the basic process operation starts.

At step S1, initial setting process such as the initialization of flags, registers and the like necessary for the following process and the display of an initial screen on the display unit 5 is executed.

If it is decided at step S2 that a job menu "Retrieval" has been selected from the initial screen displayed on the display unit 5, the program goes to step S3; if not, the program goes to step S4.

At step S3, according to the selected job menu "Retrieval", a retrieval process is executed where desired image data is retrieved from the image data storage 12 and displayed on the display unit 5. After that, the program goes to step S17. It is noted that this retrieval process is done by the image data retrieval processor 4.

If it is decided at step S4 that a job menu "Dictionary creation" has been selected from the initial screen displayed on the display unit 5, the program goes to step S5; if not, the program goes to step S6.

At step S5, according to the selected job menu "Dictionary creation", a dictionary creation process is executed, where an image dictionary (image space) and a keyword dictionary (keyword space) are set based on an exemplary image to which a keyword has previously been attached, and the coordinates of the exemplary image on the image dictionary and the coordinates of the attached keyword on the keyword dictionary are determined and stored in the dictionary storage 8. After that, the program goes to step S17. In addition, the dictionary creation process is done by the dictionary creation processor 6.

If it is decided at step S6 that a job menu "Keyword registration" has been selected from the initial screen displayed in the display unit 5, the program goes to step S7; if not, the program goes to step S8.

At step S7, according to the selected job menu "Keyword registration", a keyword registration process is executed where the keyword inputted from the input unit 1 is registered in the keyword storage 3 together with the coordinate values on the keyword space. After that, the program goes to step S17. In addition, the keyword registration process is done by the keyword registration processor 2.

If it is decided at step S8 that a job menu "Vector conversion coefficient preparation" has been selected from the initial screen displayed on the display unit 5, the program goes to step S9; if not, the program goes to step S10.

At step S9, according to the selected job menu "Vector conversion coefficient preparation", a canonical correlation analysis of the n-dimensional coordinate vector of each of the images stored in the above created dictionary and the p-dimensional feature vector extracted from the image data of each image is executed, and a vector conversion coefficient preparation process for determining canonical-correlation coefficient matrices A1 and A2 which will be detailed later is executed. After that, the program goes to step S17. It is noted that the canonical-correlation coefficient matrix A1 is a vector conversion coefficient for converting an n-dimensional coordinate vector into a k-dimensional composite variable vector "f", while the canonical-correlation coefficient matrix A2 is a vector conversion coefficient for converting a p-dimensional feature vector into a k-dimensional composite variable vector "f". In addition, the vector conversion coefficient preparation process is done by the vector-conversion-coefficient preparation processor 9.

If it is decided at step S10 that a job menu "Data registration" has been selected from the initial screen displayed on the display unit 5, the program goes to step S11; if not, the program goes to step S12.

At step S11, according to the selected job menu "Data registration", an image data registration process is executed where image data inputted from the input unit 1 is captured and a keyword is attached to this image data and registered in the image data storage 12 together with the image data. After that, the program goes to step S17. In addition, the image data registration process is done by the image data registration processor 11.

If it is decided at step S12 that a job menu "Additional information change" has been selected from the initial screen displayed on the display unit 5, the program goes to step S13; if not, the program goes to step S14.

At step S13, according to the selected job menu "Additional information change", an additional information changing process is executed where image data registered in the image data storage 12 is captured and then additional information, such as keywords, attached to this image data are changed. After that, the program goes to step S17. In addition, the additional information changing process is done by the additional information change processor 13.

If it is decided at step S14 that a job menu "Other menu" has been selected from the initial screen displayed on the display unit 5, the program goes to step S15; if not, the program goes to step S16.

At step S15, according to the selected job menu "Other menu", an other menu process such as printout of a retrieved image is executed. After that, the program goes to step S17.

At step S16, it is decided whether or not "End" has been selected from the initial screen displayed on the display unit 5. As a result, if "End" has been selected, the program ends the basic process operation; if not, the program goes to step S17.

At step S17, other process is executed. After that, the program returns to step S2, where the program moves to the next menu process. Then, if "End" is selected at step S16, the program ends the basic process operation.

The above "dictionary creation process", "keyword registration process", "vector-conversion-coefficient preparation process", "image data registration process" and "Additional information changing process" are described in detail below. It is noted that the "retrieval process" and the "other menu process" have no direct relation to the present invention and so their detailed description is omitted.

Figure 5:
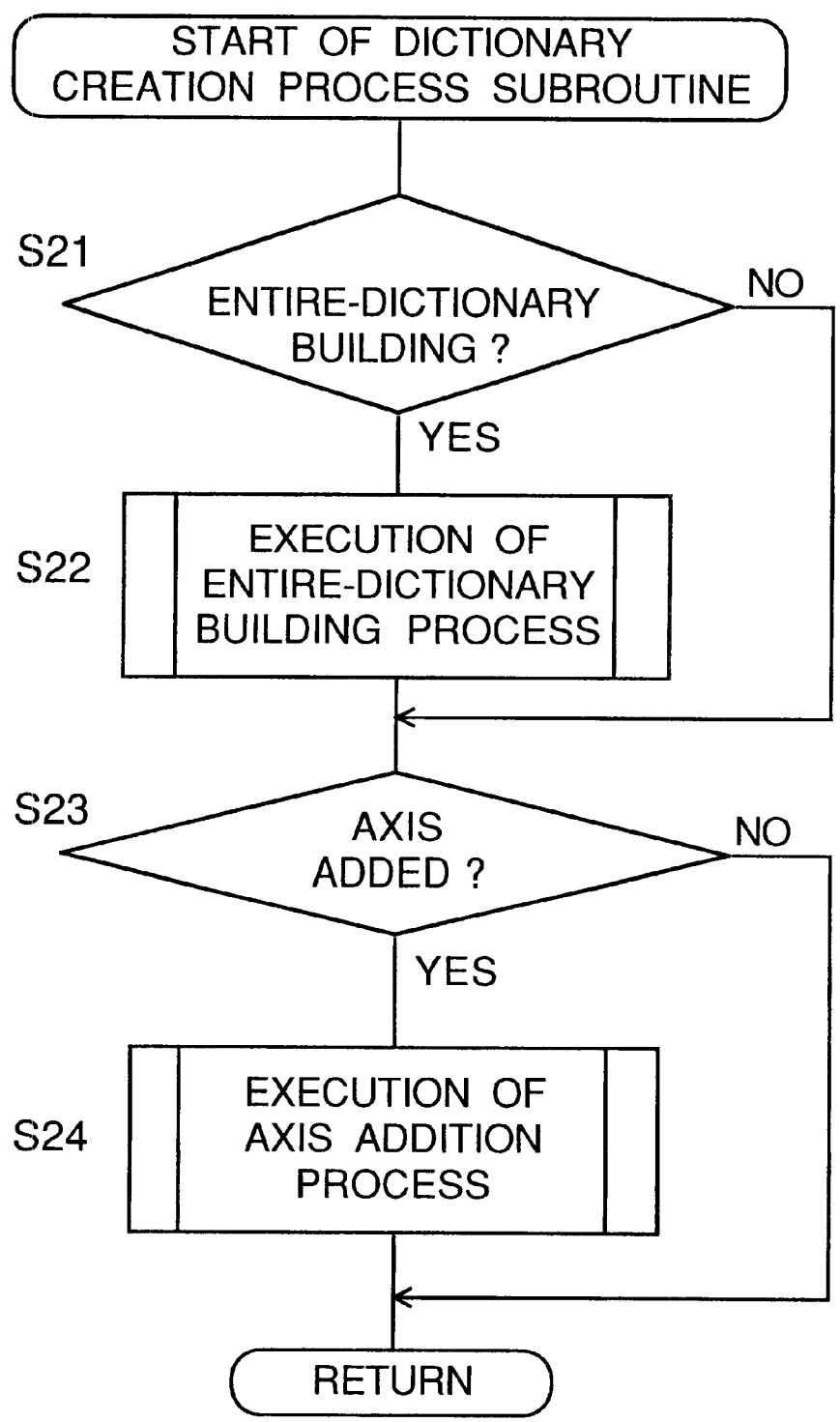
FIG. 5 is a flow chart of a dictionary creation process subroutine to be executed by the dictionary creation processor in FIG. 1.

FIG. 5 is a flow chart of a dictionary creation process subroutine to be executed by the dictionary creation processor 6 at step S5 in the basic process operation shown in FIG. 4. Hereinbelow, the operation of dictionary creation process is explained in detail with reference to FIG. 5. If it is decided at step S4 in the basic-process-operation main routine shown in FIG. 4 that the job menu "Dictionary creation" has been selected, the dictionary creation process subroutine starts.

It is noted here that the aforementioned dictionary is a correlation dictionary between a plurality of images and keywords attached to the individual images, comprising an image dictionary in which the coordinate vector of each image on the n-dimensional meaning space is registered and a keyword dictionary in which the coordinate vector of each keyword on the meaning space is registered. In addition, the above dictionary is built up based on sample data including many exemplary images in which a plurality of keywords are attached to each one exemplary image by questionnaire.

FIGS. 6A and 6B show examples of the sample data. FIG. 6A represents whether the keyword has been attached to an exemplary image (1) or not (0). FIG. 6B, on the other hand, represents the number of people who have attached the keyword to the exemplary image. Otherwise, the sample data may be either one which represents whether the keyword has been attached to the threshold number or more of times to the exemplary image (1) or not (0), or another which has been collected with keywords weighted. In addition, the sample data include feature quantities of each exemplary image, which are used in the later vector-conversion-coefficient preparation process.

At step S21, it is decided by interaction with the user whether or not the entire-dictionary building is executed. As a result, if the entire-dictionary building is executed, the program goes to step S22; if not, the program goes to step S23.

At step S22, the entire-dictionary building process is executed in a manner detailed later.

At step S23, it is decided by interaction with the user whether the addition of an axis to the dictionary is executed. As a result, if an axis is added, the program goes to step S24; if not, the program ends the dictionary creation process subroutine, returning to the basic-process-operation main routine shown in FIG. 4.

At step S24, an axis addition process is executed in a manner detailed later. After that, the program ends the dictionary creation process subroutine, returning to the basic-process-operation main routine shown in FIG. 4.

Figure 7:
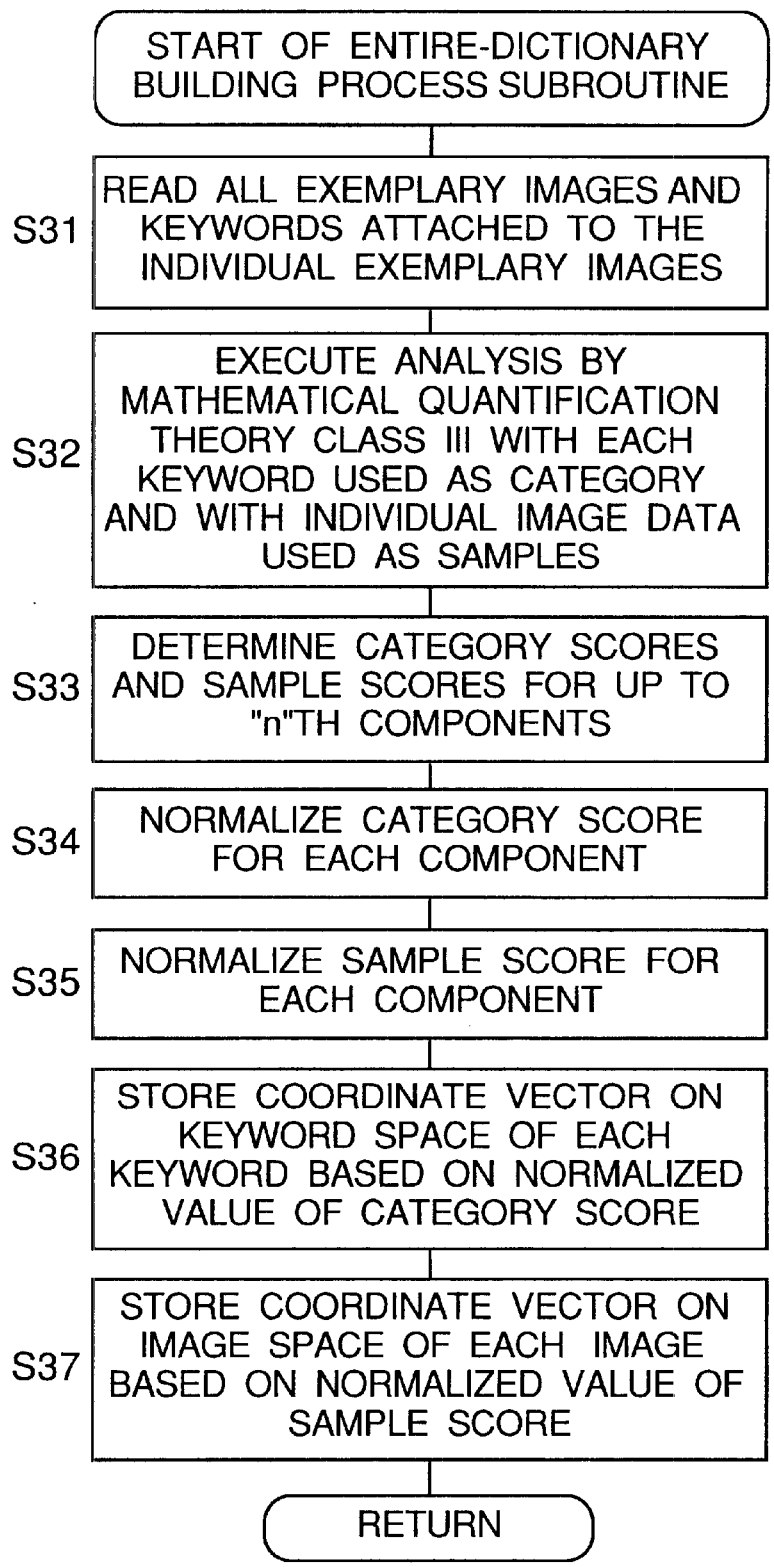
FIG. 7 is a flow chart of an entire-dictionary building process subroutine to be executed during the dictionary creation process subroutine shown in FIG. 5.

FIG. 7 is a flow chart of an entire-dictionary building process subroutine to be executed at step S22 of the dictionary creation process subroutine shown in FIG. 5. Hereinbelow, the operation of the entire-dictionary building process is explained in detail with reference to FIG. 1 and FIG. 7. When "Entire-dictionary building" is specified at step S21 in the dictionary creation process subroutine shown in FIG. 5, the entire-dictionary building process subroutine starts.

At step S31, the sample data is read from the input unit 1 and stored in internal memory. Then, all the exemplary images and keywords attached to the individual exemplary images are fetched in pairs.

At step S32, with the individual keywords assumed as categories and with image data of the individual images assumed as samples, an analysis by mathematical quantification theory class III is executed.

The mathematical quantification theory class III is one of multivariate analyses, in which both samples and categories are quantified as coordinates on the n-dimensional meaning space based on how a sample corresponds to the various categories. That is, when a quantity of $x_i^{(n)}$ is given to a sample "i" and a quantity of $y_j^{(n)}$ is given to a category "j", $x_i^{(n)}$ and $y_j^{(n)}$ that cause the correlation coefficient of $x_i^{(n)}$ and $y_j^{(n)}$ to be maximum are determined.

At step S33, from the result of the analysis by the mathematical quantification theory class III, category scores $y_j^{(n)}$ and sample scores $x_i^{(n)}$ for up to the "n"th components are obtained, where n is a number smaller than the smaller of the category number and the sample number.

At step S34, each category score is normalized so that the maximum value of the category score becomes "1" and the minimum value becomes "−1", for each component.

At step S35, each sample score is normalized so that the maximum value of the sample score becomes "1" and the minimum value becomes "−1", for each component.

At step S36, coordinate vectors on the n-dimensional meaning space (keyword space) of the individual keywords obtained from the normalized values for the individual category scores determined at step S34 are stored in the dictionary storage 8 as a keyword dictionary.

At step S37, the coordinate vectors on the n-dimensional meaning space of the individual images obtained from the normalized values of the individual sample scores determined at step S35 are stored in the dictionary storage 8 as an image dictionary. After that, the program ends the entire-dictionary building process subroutine, returning to the basic-process-operation main routine shown in FIG. 4.

The n-dimensional meaning space (keyword space) of keywords and the n-dimensional meaning space (image space) of images built up as described above have a high correlation. Therefore, with respect to an arbitrary image on the image space, a keyword suitable for the image is placed in the neighborhood of the coordinates on the keyword space corresponding to the coordinates of the image on the image space. Conversely, with respect to an arbitrary keyword on the keyword space, an image suitable for the keyword is placed in the neighborhood of coordinates on the image space corresponding to the coordinates of the keyword on the keyword space.

That is, in this embodiment, the keyword space defining means is implemented by the steps S32 to S34, S36 in the entire-dictionary building process subroutine. Also, the object space defining means is implemented by the steps S32, S33, S35 and S37 in the entire-dictionary building process subroutine. Further, the meaning space storage means is implemented by the dictionary storage 8.

Thus, coordinates vectors on the n-dimensional meaning space (keyword space) of keywords are registered as a keyword dictionary, while coordinate vectors on the n-dimensional meaning space (image space) of images are registered as an image dictionary, by which the degree of relevance between keywords and between images can be set. Therefore, a keyword similar to one keyword or an image similar to one image can be easily obtained by looking into the keyword dictionary or the image dictionary. Further, a suitable keyword to be attached to a new image can be retrieved.

Figure 8:
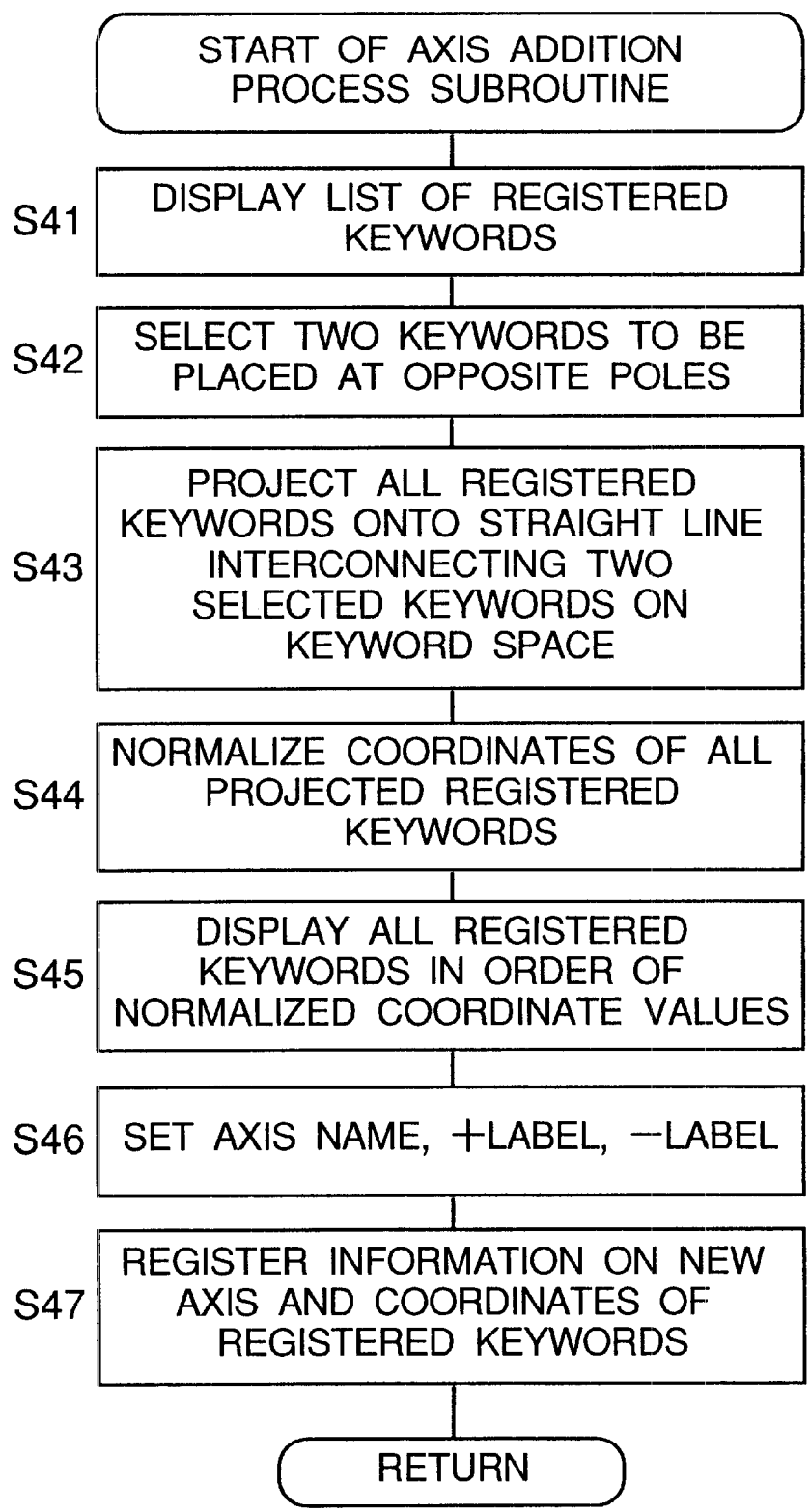
FIG. 8 is a flow chart of an axis addition process subroutine to be executed by the axis adder in FIG. 1.

FIG. 8 is a flow chart of an axis addition process subroutine to be executed by the axis adder 7 of the dictionary creation processor 6 at step S24 of the dictionary creation process subroutine shown in FIG. 5. Hereinbelow, the operation of the axis addition process is explained in detail with reference to FIG. 1 and FIG. 8. When "Axis addition" is specified at step S23 in the dictionary creation process subroutine shown in FIG. 5, the axis addition process subroutine starts.

At step S41, a list of registered keywords registered in the keyword storage 3 is shown in the display unit 5.

At step S42, two keywords to be placed at opposite poles are selected from among the registered keywords by interaction with the user.

At step S43, a two-axis map in which two axes that cause the distance between the selected keywords to be the largest are combined together is prepared on the keyword space. Then, all the registered keywords are projected on a straight line interconnecting the two selected keywords on the map, so that coordinates on the straight line of all the registered keywords are obtained.

At step S44, the coordinate value of each registered keyword is normalized so that the maximum value out of the coordinates on the straight line of all the registered keywords obtained at step S43 becomes "1" and the minimum value becomes "−1".

At step S45, all the registered keywords are displayed in the display unit 5 in an order of the normalized coordinates.

At step S46, a name of the axis that assumes the straight line as a new coordinate axis is set, and a "+" label and a "31" label of the new axis are set, by interaction with the user.

At step S47, information as to the set new axis and the coordinates on the new axis of all the registered keywords are additionally registered in the dictionary storage 8. After that, the program ends the axis addition process subroutine, returning to the basic-process-operation main routine shown in FIG. 4.

That is, in this embodiment, the keyword specifying means is implemented by the steps S41, S42 in the axis addition process subroutine. Also, the axis adding means is implemented by the steps S43 to S46 in the axis addition process subroutine.

In this connection, the user cannot know the concrete meanings of n (n: integer) axes obtained as a result of the analysis by the mathematical quantification theory class III. However, by the user freely setting such a new axis as described above, registered keywords can be placed on an axis the meaning of which can be known by the user.

Figure 9:
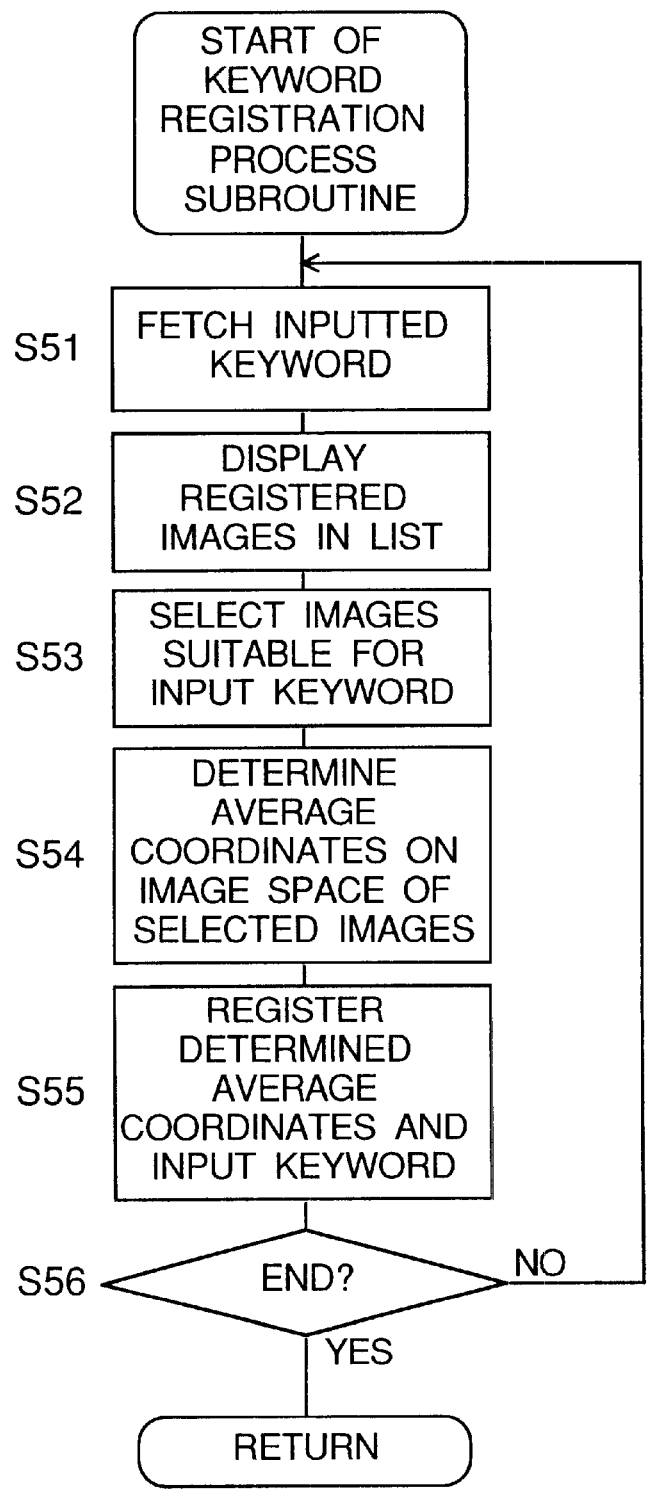
FIG. 9 is a flow chart of a keyword registration process subroutine to be executed by the keyword registration processor in FIG. 1.

FIG. 9 is a flow chart of the keyword registration process subroutine to be executed by the keyword registration processor 2 at step S7 in the basic process operation shown in FIG. 4. Hereinbelow, the operation of the keyword registration process is explained in detail with reference to FIG. 9. If it is decided at step S6 of the basic-process-operation main routine shown in FIG. 4 that the job menu "Keyword registration" has been selected, then the keyword registration process subroutine starts.

At step S51, an input keyword inputted from the input unit 1 by the user is fetched.

At step S52, a list of registered images is displayed on the display unit 5 based on image data registered in the image date storage 12.

At step S53, images suitable for the input keyword are selected from among the registered images displayed in the list by interaction with the user. In addition, at least one image has to be selected, and a plurality of images may also be selected.

At step S54, the coordinate vector on the image dictionary of the image selected at step S53 is read from the dictionary storage 8, and average coordinates of the selected images on the image space (image dictionary) are determined. This calculation of the average coordinates is achieved by determining a vector having element values resulting from simply averaging the individual element values of the read coordinate vectors. In addition, because the average coordinates on the image space are corresponded to the same coordinates on the keyword space which is the same meaning space, the average coordinates can be considered as the coordinates of the input keyword on the keyword space.

At step S55, the coordinate vector of the average coordinates determined at step S54 is attached to the input keyword, and additionally registered in the keyword storage 3. Also, position information of the input keyword on the keyword space is additionally registered in the dictionary storage 8.

At step S56, it is decided by interaction with the user whether the keyword registration has been ended. As a result, if it has not been ended, the program returns to step S51, moving to the input of the next keyword; if it has been ended, the program returns to the main routine shown in FIG. 4.

Thus, for the user with a simple operation of selecting an image suitable for a keyword to be newly registered, the position of the registration-target keyword on the keyword space is automatically determined based on the position of the selected image on the image space, and registered at the resulting position on the keyword space. In addition, as the keyword dictionary is expanded by keywords being newly added to the keyword dictionary as shown above, there will soon occur a need of changing coordinates of the pre-registered keywords by the effects of the coordinates of the additionally registered keywords. In that case, by executing the "Entire-dictionary building process" once again, a keyword dictionary in which the latest judgment criteria for the user's keyword setting have been reflected can be built up.

That is, in this embodiment, the keyword registration means is implemented by the steps S54, S55 in the keyword registration process subroutine.

In this connection, because the image dictionary (image space) and the keyword dictionary (keyword space) built up in this way are of the same n-dimensional meaning space, the two dictionaries have a high correlation to each other. Therefore, if the position of an image to be newly registered on the image dictionary is known, a keyword present in the neighborhood of the position on the keyword dictionary corresponding to the position on the image dictionary can automatically be attached thereto as a keyword suitable for the image to be newly registered. Thus, in order to implement such an automatic keyword attachment, it becomes necessary to know the position on the image dictionary of the image to be newly registered.

Meanwhile, such feature quantities as color, shape, texture and the like are available as values representing the characteristics of an image. Therefore, if the relationship between feature quantities of the image and its position on the image dictionary is known, then the position on the image dictionary of the image to be newly registered can be known by determining the feature quantities of the image to be newly registered. Hereinbelow, the relationship between the position of an image on the image dictionary and its feature quantities, i.e., an analysis of the correspondence between two groups of variables that have been quantitatively measured is described.

The canonical correlation analysis is available as a method for analyzing the correlation structure between two groups of variables $X(X_1, X_2, \ldots, X_n), Y(Y_1, Y_2, \ldots, Y_p)$. According to this canonical correlation analysis, an n-dimensional coordinate vector of r (r: integer) images on the image dictionary is assumed to be X, and its composite variable matrix is assumed to be $F(=A1 \cdot X^T)$. On the other hand, a p-dimensional feature vector is assumed to be Y, and its composite variable matrix is assumed to be $G(=A2 \cdot Y^T)$. Then, the canonical correlation coefficient matrices A1, A2 are determined so as to obtain a high correlation between the composite variable matrices F, G. As a result, a space of the (r×k) composite variable matrix F and a space of the (r×k) composite variable matrix G corresponded in a high correlation to each other are built up. Thus, if a vector on the space of the composite variable matrix G based on the feature vector of the image is given, then the coordinate vector of the same image on the image dictionary can be determined via a corresponding vector on the space of the composite variable matrix F. In other words, the canonical correlation coefficient matrix A1 is a vector conversion coefficient for converting an n-dimensional coordinate vector into a k-dimensional composite variable vector if, and the canonical correlation coefficient matrix A2 is a vector conversion coefficient for converting a p-dimensional feature vector into a k-dimensional composite variable vector "g".

Figure 10:
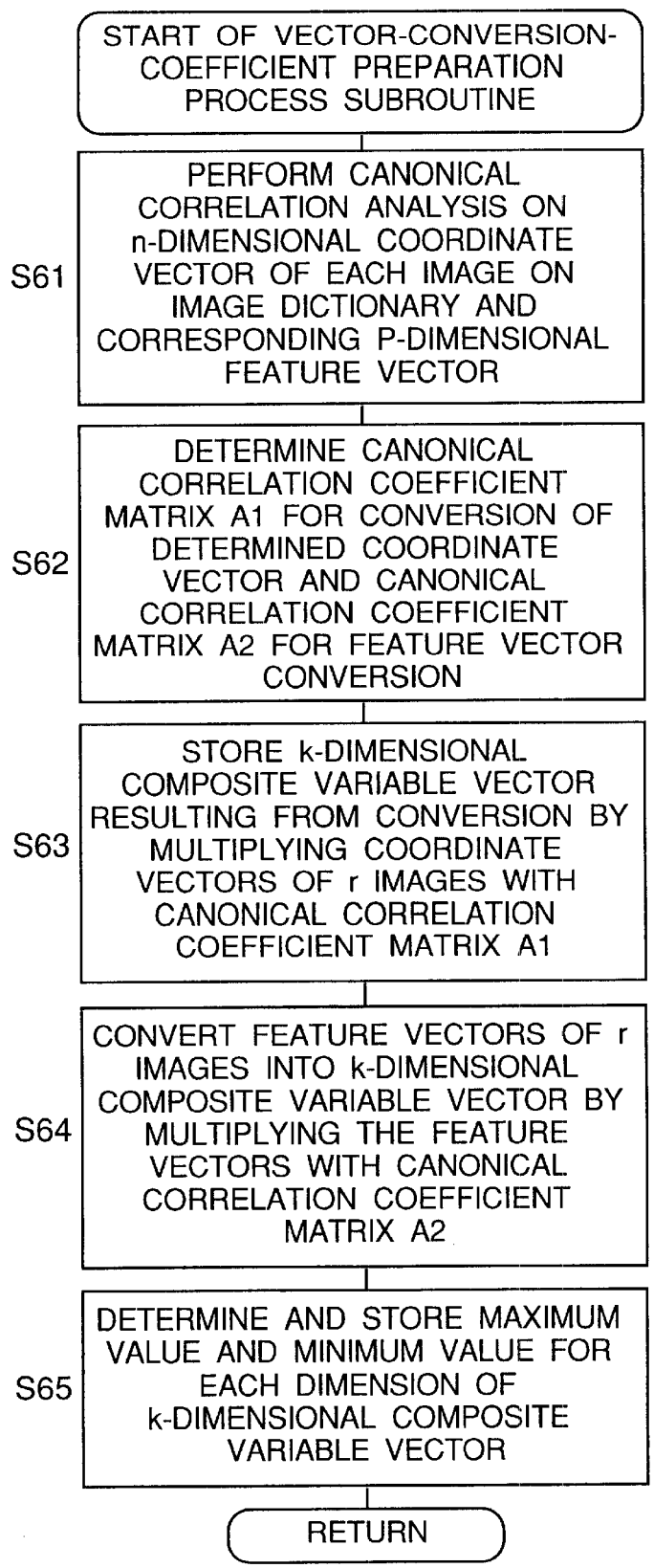
FIG. 10 is a flow chart of a vector-conversion-coefficient preparation process subroutine to be executed by the vector conversion coefficient preparator in FIG. 1.

FIG. 10 is a flow chart of a vector-conversion-coefficient preparation process subroutine to be executed by the vector-conversion-coefficient preparation processor 9 at step S9 in the basic process operation shown in FIG. 4. Hereinbelow, the operation of the vector-conversion-coefficient preparation process is explained in detail with reference to FIG. 1 and FIG. 10. If it is decided at step S8 of the basic-process-operation main routine shown in FIG. 4 that the job menu "Vector conversions coefficient preparation" has been selected, then the vector-conversion-coefficient preparation process subroutine starts.

At step S61, an n-dimensional coordinate vector of each image on the image dictionary is read from the dictionary storage 8. Meanwhile, a p-dimensional feature vector of the corresponding image is read from the internal memory. Then, a canonical correlation analysis of the coordinate vector of the read image and its corresponding feature vector is executed.

At step S62, the canonical correlation coefficient matrix A1(n×k) for coordinate vector conversion and the canonical correlation coefficient matrix A2(p×k) for feature vector conversion obtained from the canonical correlation analysis at step S61 are stored in the vector conversion coefficient storage 10.

At step S63, the coordinate vectors of the r images stored in the image dictionary is multiplied with the canonical correlation coefficient matrix A1 so as to be converted into a k-dimensional composite variable vector "f". Then, the resulting composite variable vector "f" is stored in the vector conversion coefficient storage 10.

At step S64, the feature vector of the r images is multiplied with the canonical correlation coefficient matrix A2 so as to be converted into the k-dimensional composite variable vector "g".

At step S65, the maximum value and the minimum value are determined with respect to each dimension of the k-dimensional composite variable vector "g" determined at step S64, and stored in the vector conversion coefficient storage 10. After that, the program ends the vector-conversion-coefficient preparation process operation, returning to the main routine shown in FIG. 4.

That is, in this embodiment, the correlation calculating means is implemented by the steps S61, S62 in the vector-conversion-coefficient preparation process subroutine.

Now that the canonical correlation coefficient matrix A2 for converting the p-dimensional feature vector of the image into the k-dimensional composite variable vector "g" has been determined in the above way, the position of the image on the image dictionary can be estimated. Accordingly, a keyword suitable for the image to be newly registered can be attached automatically. Hereinbelow, the image data registration process in which a keyword auto-attaching operation is included is explained.

Figure 11:
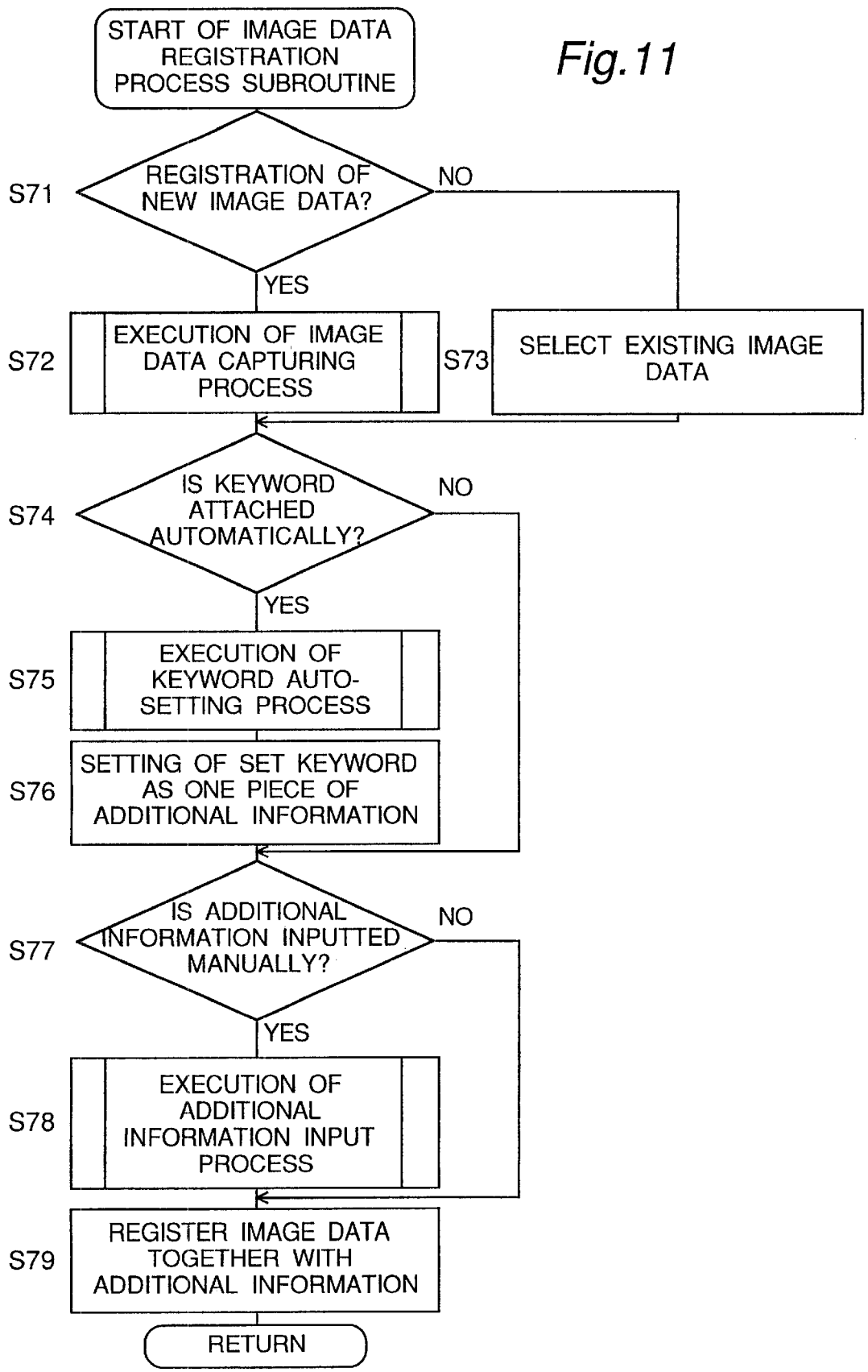
FIG. 11 is a flow chart of an image data registering process subroutine to be executed by the image data registration processor in FIG. 1.

FIG. 11 is a flow chart of an image data registration process subroutine to be executed by the image data registration processor 11 at step S11 in the basic process operation shown in FIG. 4. Hereinbelow, the operation of the image data registration process is explained in detail with reference to FIG. 1 and FIG. 11. If it is decided at step S10 in the basic-process-operation main routine shown in FIG. 4 that the job menu "Data registration" has been selected, then the image data registration process subroutine starts.

At step S71, it is decided by interaction with the user whether or not new image data is registered. As a result, if new image data is registered, the program goes to step S72; if not, the program goes to step S73.

At step S72, an image data capturing process is executed in a manner detailed later. After that, the program goes to step S74.

At step S73, existing image data is selected and read.

At step S74, it is decided by interaction with the user whether or not a keyword is attached automatically. As a result, if an automatic keyword attachment is executed, the program goes to step S75; if not, the program goes to step S77.

At step S75, the keyword auto-setting processor 14 is controlled as will be detailed later, so that the keyword auto-attaching process is executed.

At step S76, a keyword set at step S75 is set as one piece of additional information for the image data captured at step S72 or step S73.

At step S77, it is decided by interaction with the user whether or not additional information is inputted manually. As a result, if the additional information is inputted manually, the program goes to step S78; if not, the program goes to step S79.

At step S78, the additional information input processor 17 is controlled as described in detail later, so that the additional information input process is executed.

At step S79, the captured image data is associated with the set additional information, and registered in the image data storage 12. After that, the program ends the image data registration process, returning to the main routine shown in FIG. 4.

Thus, for the user only by setting the job menu "Data registration" and specifying "Keyword auto-setting" from the input unit 1, a keyword suitable for the registration-target image is automatic set, and registered as it is attached to the pertinent image data.

FIG. 12 is a flow chart of an image data capturing process subroutine to be executed at step S72 in the image data registration process subroutine shown in FIG. 11. Hereinbelow, the operation of the image data capturing process is explained in detail with reference to FIG. 1 and FIG. 12. If it is decided at step S71 of the image data registration process subroutine shown in FIG. 11 that new image data is registered, then the image data capturing process subroutine starts.

At step S81, new image data is captured from the input unit 1 (an image input device such as the scanner 28 or the CD-ROM drive 29b or an image data storage medium such as the hard disk drive 26).

At step S82, a storage destination such as working memory for storing the captured image data is specified.

At step S83, the captured image data is given an image data name set from the input unit 1 by the user, and stored in the working memory. After that, the program ends the image data capturing process subroutine, returning to the image data registration process subroutine shown in FIG. 11.

FIG. 13 is a flow chart of a keyword auto-setting process subroutine to be executed by the keyword auto-setting processor 14 at step S75 in the image data registration process subroutine shown in FIG. 11. Hereinbelow, the operation of the keyword auto-setting process is explained in detail with reference to FIG. 1 and FIG. 3. If it is decided at step S74 of the image data registration process subroutine shown in FIG. 11 that a keyword is attached automatically, then the keyword auto-setting process subroutine starts.

At step S91, p (p: integer) feature quantities such as hue, shape and texture are extracted by the feature quantity extractor 15 from the image data captured at step S72 or step S73 of the image data registration process subroutine shown in FIG. 11, by which a p-dimensional feature vector is obtained.

At step S92, a vector conversion process is executed in a manner detailed later. By this vector conversion process, the p-dimensional feature vector extracted at step S91 is converted into a k-dimensional composite variable vector "g".

At step S93, a neighboring-image extraction process is executed in a manner detailed later. By this neighboring-image extraction process, a neighboring image for the registration-target image is extracted based on the k-dimensional composite variable vector "g" obtained by the conversion at step S92.

At step S94, a near-image keyword extraction process is executed in a manner detailed later. By this near-image keyword extraction process, near-image keywords in the neighborhood of the neighboring image extracted at step S93 are extracted by using the image dictionary.

At step S95, overlapped keywords are excluded from among the near-image keywords extracted at step S94, and fixed as setting-use keywords. After that, the program ends the keyword auto-setting process subroutine, returning to the image data registration process subroutine shown in FIG. 11.

That is, in this embodiment, the object-position calculating means is implemented by the step S92 in the keyword auto-setting process subroutine, the keyword selecting means is implemented by the steps S93 to S95, the neighboring-object extracting means is implemented by the step S93, the neighboring-keyword extracting means is implemented by the steps S94, S95, and the keyword attaching means is implemented by the steps S76, S79 in the image data registration process subroutine.

Figure 14:
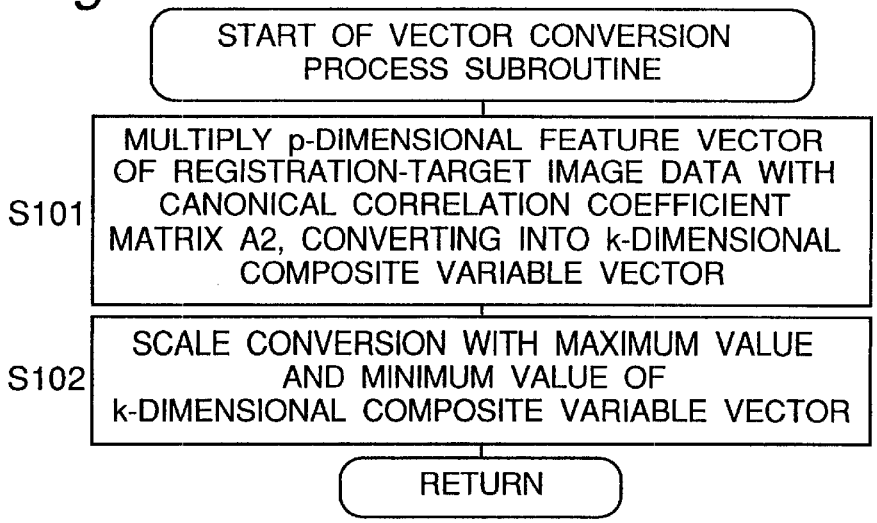
FIG. 14 is a flow chart of a vector conversion process subroutine to be executed by the vector converter in FIG. 1.

FIG. 14 is a flow chart of a vector conversion process subroutine to be executed by the vector converter 16 at step S92 in the keyword auto-setting process subroutine shown in FIG. 13. Hereinbelow, the operation of the vector conversion process is explained in detail with reference to FIG. 14. If a p-dimensional feature vector of the registration-target image data has been extracted at step S91 of the keyword auto-setting process subroutine shown in FIG. 13, then the vector conversion process subroutine starts.

At step S101, the extracted p-dimensional feature vector is multiplied with canonical correlation coefficient matrix A2 (p×k) for feature vector conversion stored in the vector conversion coefficient storage 10 so as to be converted into a k-dimensional composite variable vector "g".

At step S102, the individual element values (values of individual dimensions) of the k-dimensional composite variable vector "g" determined from the feature vector at step S101 are changed in scale by using the maximum value and the minimum value for each dimension of the k-dimensional composite variable vector "g" determined from the feature vectors of pre-registered r (r: integer) images stored in the vector conversion coefficient storage 10. Thus, the composite variable vector "g" of the registration-target image is placed at the pertinent position on the space of the composite variable matrix G. After that, the program ends the vector conversion process operation, returning to the keyword auto-setting process subroutine shown in FIG. 13.

Figure 15:
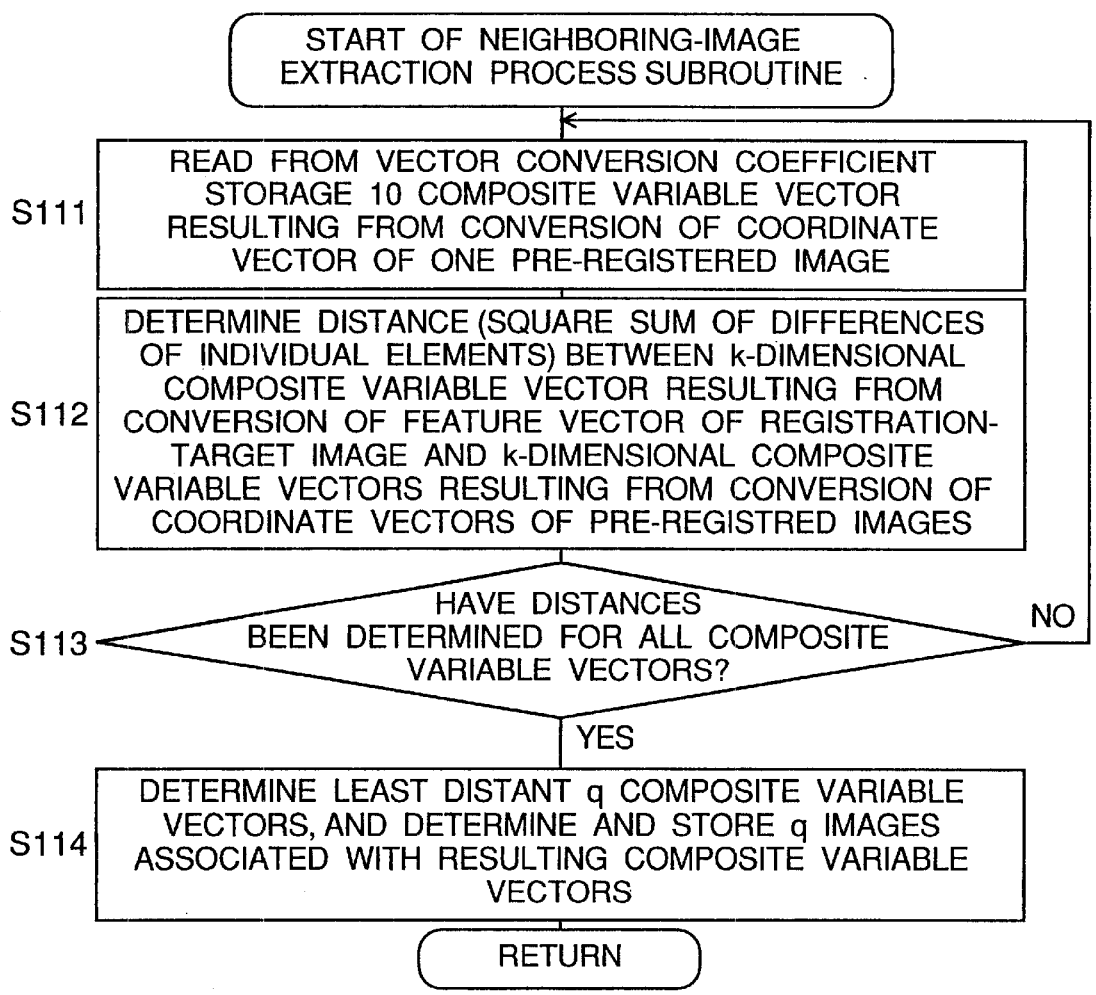
FIG. 15 is a flow chart of a neighboring-image extraction process subroutine to be executed during the keyword auto-setting process shown in FIG. 13.

FIG. 15 is a flow chart of a neighboring-image extraction process subroutine to be executed at step S93 in the keyword auto-setting process subroutine shown in FIG. 13. Hereinbelow, the operation of the neighboring-image extraction process is explained in detail with reference to FIG. 15. If the p-dimensional feature vector of the registration-target image data is converted into a k-dimensional composite variable vector "g" at step S92 of the keyword auto-setting process subroutine shown in FIG. 13, then the neighboring-image extraction process subroutine starts.

At step S111, one composite variable vector "f" is read out from among the r k-dimensional composite variable vectors "f" that have been converted from the coordinate vectors of the pre-registered r images and stored in the vector conversion coefficient storage 10.

At step S112, the distance between the k-dimensional composite variable vector "f" converted from the feature vector of the registration-target image and the k-dimensional composite variable vector "f" read out at step S111 is calculated. This calculation of distance is achieved by calculating the square sum of differences between the individual element values.

At step S113, it is decided whether or not the distance has been calculated with respect to the composite variable vectors "f" of all the pre-registered images stored in the vector conversion coefficient storage 10. As a result, if it has not been calculated, the program returns to the step S111, moving to the calculation of the distance from the next composite variable vector "f"; if it has been, the program goes to step S114.

At step S114, the nearest q composite variable vectors "f" are determined in an increasing order of calculated distances, and pre-registered q images associated with the determined q composite variable vectors "f" are determined as neighboring images. After that, the program ends the neighboring-image extraction process operation, returning to the keyword auto-setting process subroutine shown in FIG. 13.

Figure 16:
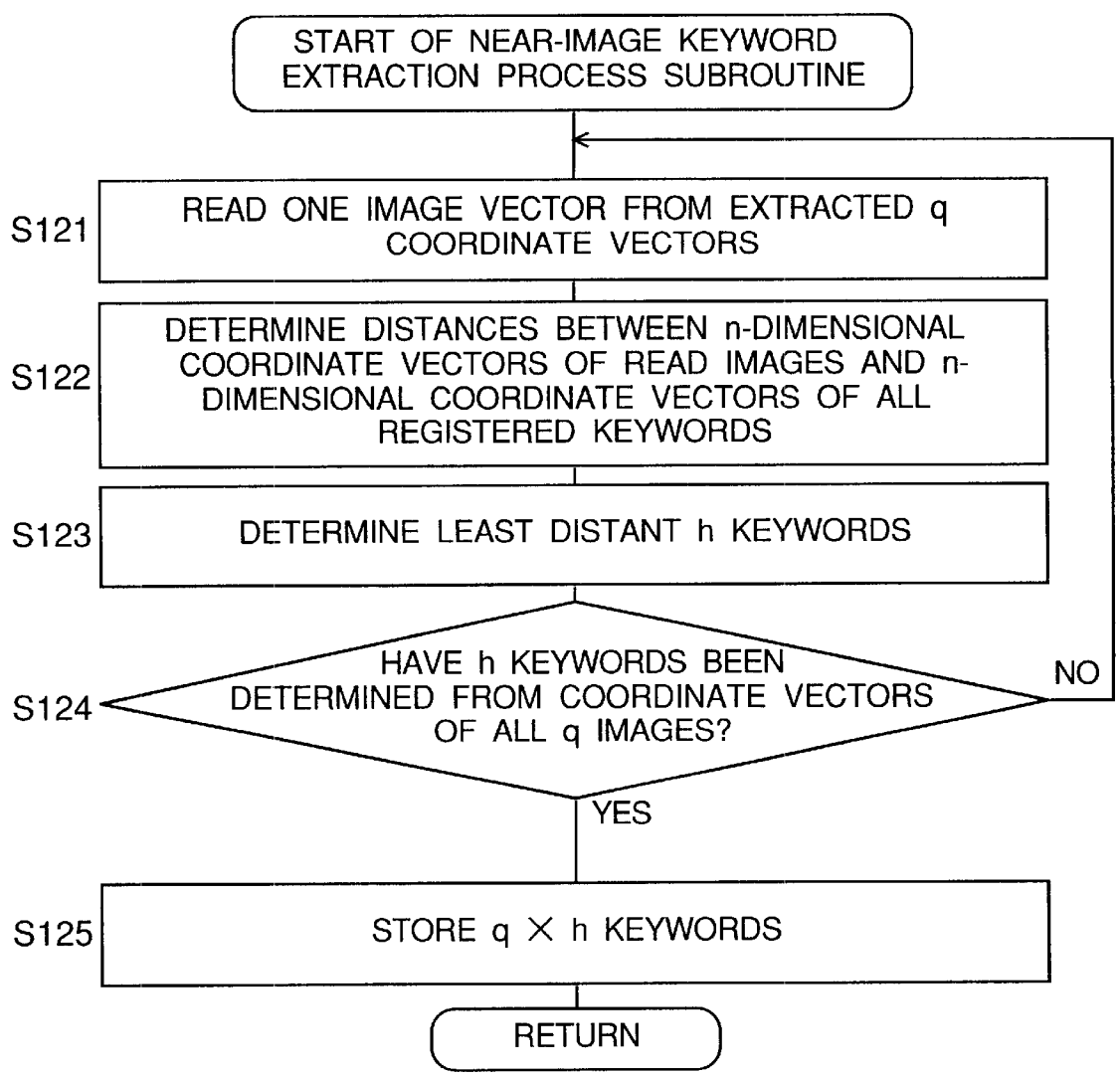
FIG. 16 is a flow chart of a near-image keyword extraction process subroutine to be executed during the keyword auto-setting process shown in FIG. 13.

FIG. 16 is a flow chart of a near-image keyword extraction process subroutine to be executed at step S94 in the keyword auto-setting process subroutine shown in FIG. 13. Hereinbelow, the operation of the near-image keyword extraction process is explained in detail with reference to FIG. 16. If a neighboring image has been extracted at step S93 of the keyword auto-setting process subroutine shown in FIG. 13, then the near-image keyword extraction process subroutine starts.

At step S121, a coordinate vector on the image space of one neighboring image out of the extracted q neighboring images is read out from the dictionary storage 8.

At step S122, distances(square sum of differences of individual elements) between the read n-dimensional coordinate vector on the image space and the n-dimensional coordinate vectors on the keyword space of all the keywords that have been registered and stored in the dictionary storage 8 are calculated, and stored in internal memory or the like.

At step S123, the nearest h keywords are determined in an increasing order of calculated distances.

At step S124, it is decided whether or not h keywords have been determined from each of the image vectors of all the extracted q neighboring images. As a result, if they have not been determined, the program returns to step S121, moving to the process for the next registered keyword. Meanwhile, if they have been determined, the program goes to step S125.

At step S125, the above determined q×h keywords are stored in the internal memory or the like as near-image keywords. After that, the program ends the near-image keyword extraction process, returning to the keyword auto-setting process subroutine.

Then, as described above, when the setting-use keyword has been fixed after excluding overlaps from among the extracted near-image keywords, the program ends the keyword auto-setting process, returning to the image data registration process subroutine. Then, the keyword set automatically in this way is set as one piece of the additional information, and if it is decided that additional information is manually inputted, the additional information input process is executed.

Figure 17:
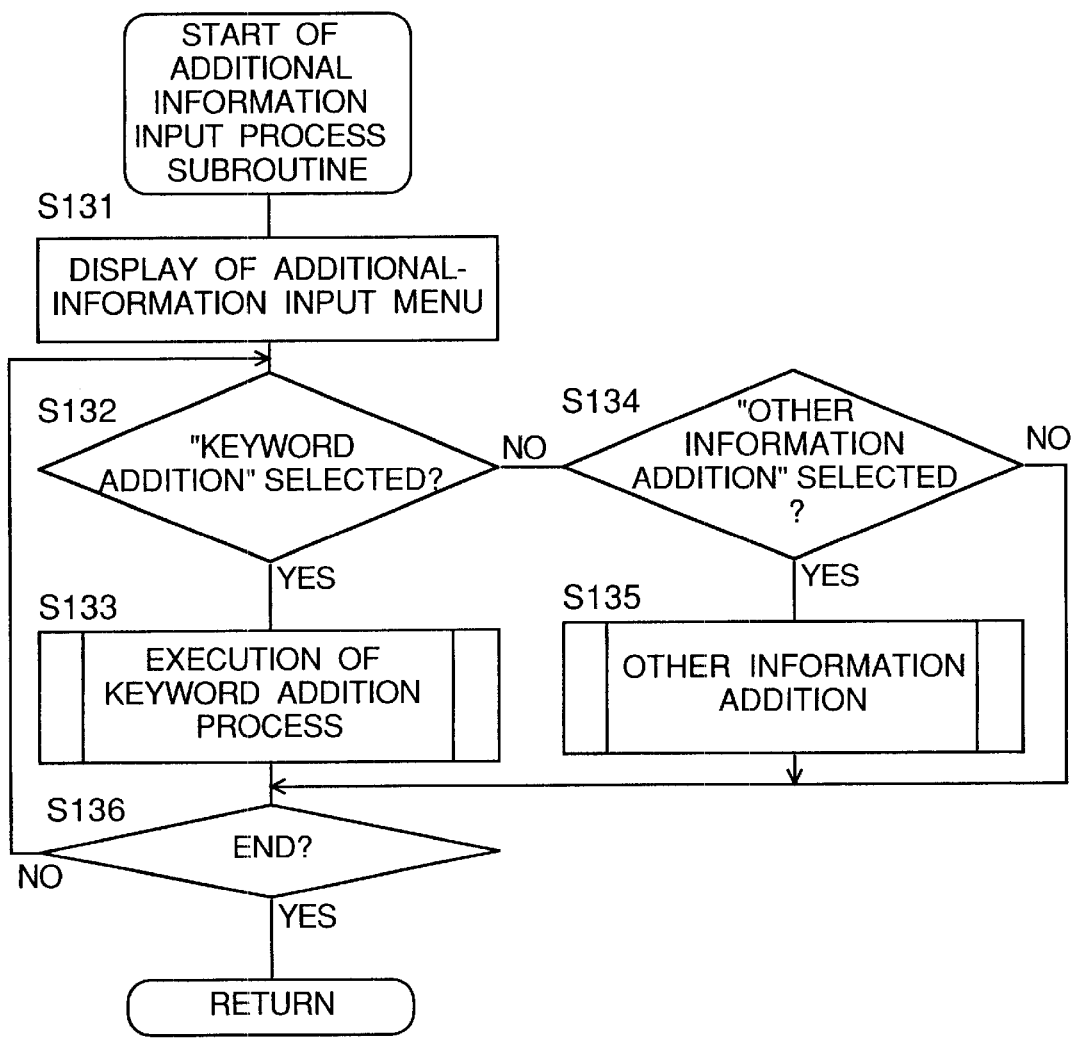
FIG. 17 is a flow chart of an additional information input process subroutine to be executed by the additional information input processor in FIG. 1.

FIG. 17 is a flow chart of an additional information input process subroutine to be executed by the additional information input processor 17 at step S78 in the image data registration process subroutine shown in FIG. 11. Hereinbelow, the operation of the additional information input process is explained in detail with reference to FIG. 1 and FIG. 17. If it is decided at step S77 of the image data registration process subroutine shown in FIG. 11 that "Manual input of additional information" has been specified, then the additional information input process subroutine starts.

At step S131, the additional information input menu is displayed in the display unit 5.

If it is decided at step S132 that an additional-information input menu "keyword addition" has been selected, the program goes to step S133; if not, the program goes to step S134.

At step S133, according to the selected additional-information input menu "keyword addition", a keyword addition process which will be detailed later is executed. After that, the program goes to step S136.

If it is decided at step S134 that an additional-information input menu "Other information addition" has been selected, then the program goes to step S135; if not, the program goes to step S136.

At step S135, according to the selected additional-information input menu "Other information addition", additional information inputted from the input unit 1 is fetched and stored in the register as one piece of the additional information of the pertinent image,data.

At step S136, it is decided by interaction with the user whether or not the additional information input process is ended. As a result, if it is ended, the program ends the additional information input process subroutine, returning to the image data registration process subroutine shown in FIG. 11. Meanwhile, if it is not ended, the program returns to step S132, moving to the next menu processing.

In this way, keywords other than the keyword set at step S75 in the image data registration process subroutine, as well as additional information such as the name of preparator, date of preparation, date of registration, size, comments of data are manually inputted by the user.

Figure 18:
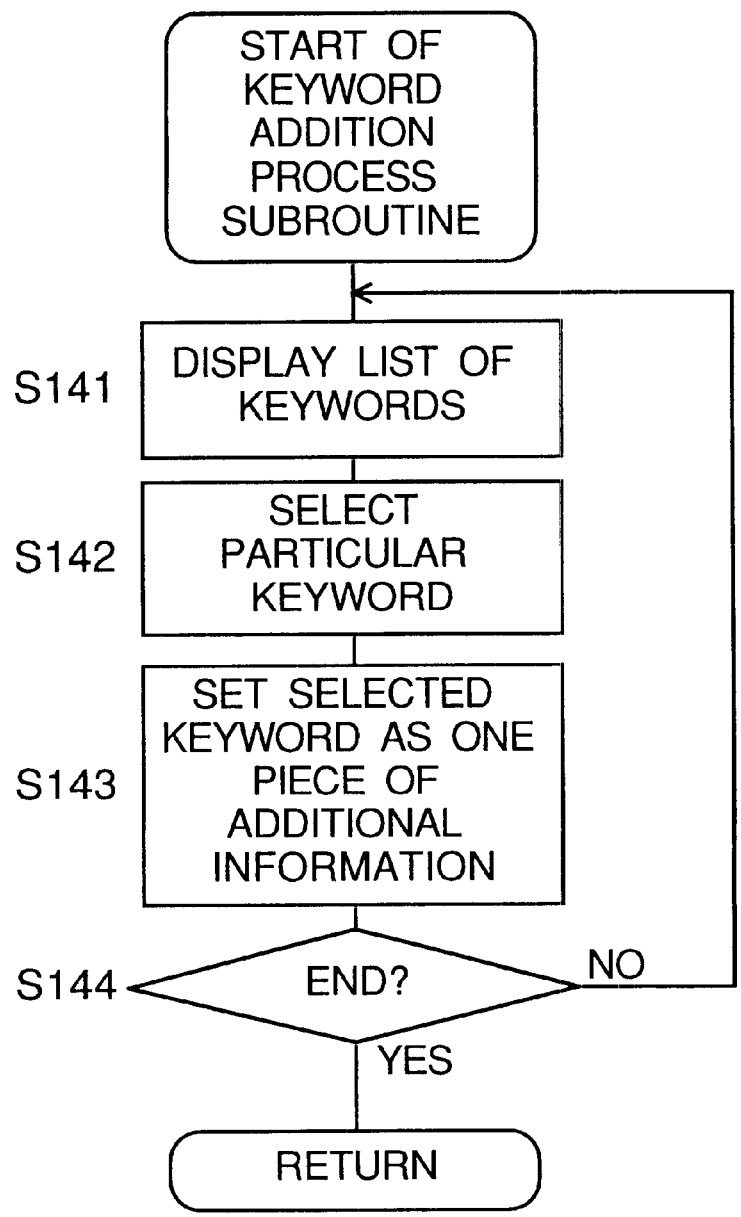
FIG. 18 is a flow chart of a keyword attaching process subroutine to be executed during the additional information input process shown in FIG. 17.

FIG. 18 is a flow chart of a keyword attaching process subroutine to be executed at step S133 of the additional information input process subroutine shown in FIG. 17. Hereinbelow, the operation of the keyword addition process is explained in detail with reference to FIG. 1 and FIG. 18. If it is decided at step S132 of the additional information input process subroutine shown in FIG. 17 that an additional-information input menu "keyword addition" has been selected, then the keyword addition process subroutine starts.

At step S141, keywords registered in the keyword storage 3 are displayed in a list in the display unit 5.

At step S142, a particular keyword is selected from among the displayed keywords by interaction with the user.

At step S143, the selected keyword is set as one piece of the additional information and held in the register.

At step S144, it is decided by interaction with the user whether or not the keyword addition process is ended. As a result, if it is not ended, the program returns to step S142, moving to the selection of the next keyword. Meanwhile, if it is ended, the program ends the keyword addition process subroutine, returning to the additional information input process subroutine shown in FIG. 17.

Then, as described above, if it is decided by interaction with the user that the additional information input process is ended, the program returns to the image data registration process subroutine. Then, the additional information set at steps S75, S76, S78 is stored in the image data storage 12 together with the registration-target image data.

Figure 19:
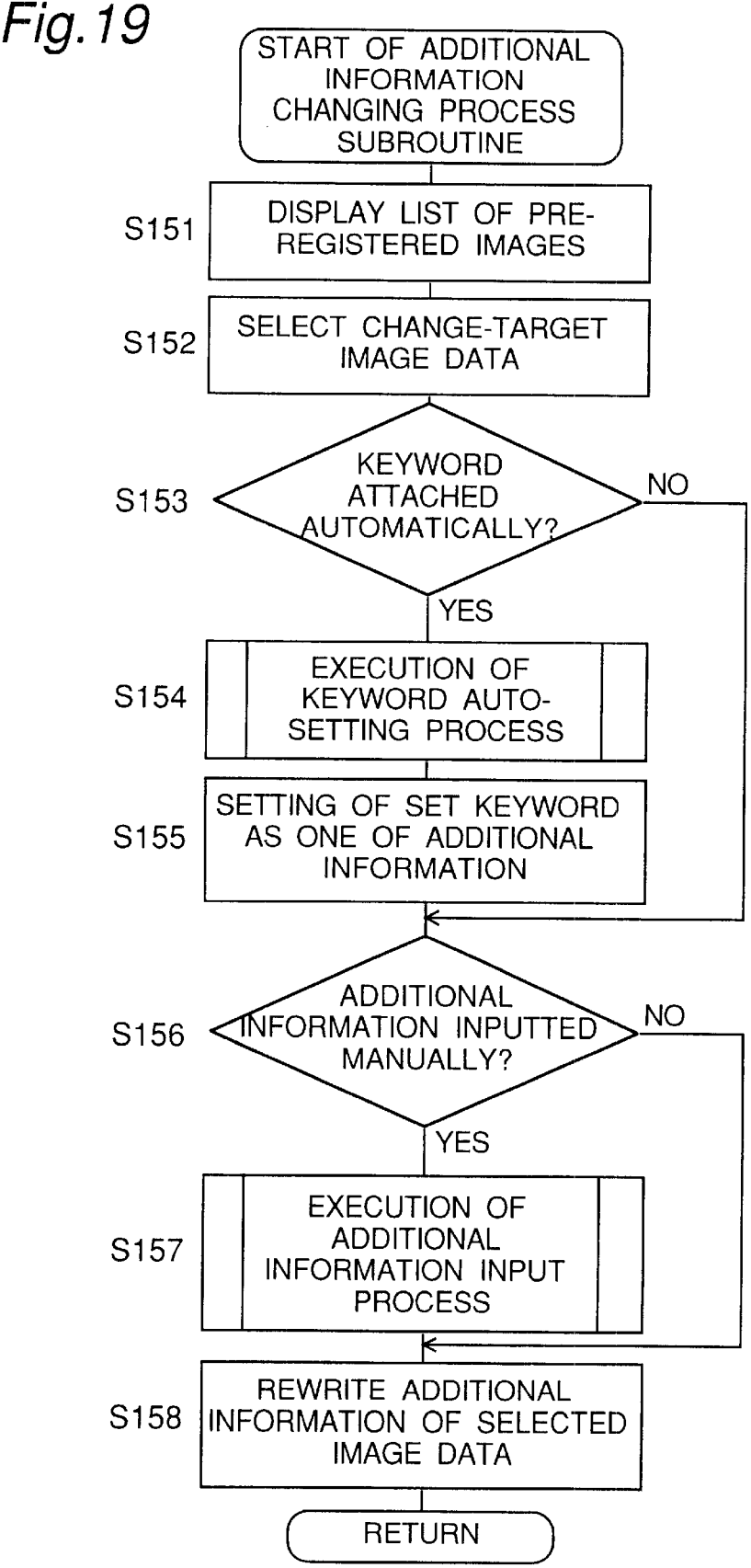
FIG. 19 is a flow chart of an additional information changing process subroutine to be executed by the additional information change processor in FIG. 1.

FIG. 19 is a flow chart of an additional information changing process subroutine to be executed by the additional information change processor 13 at step S13 in the basic process operation shown in FIG. 4. Hereinbelow, the operation of the additional information changing process is explained in detail with reference to FIG. 1 and FIG. 19. If it is decided at step S12 of the basic-process-operation main routine shown in FIG. 4 that "Additional information change" has been selected, then the additional information changing process subroutine starts.

At step S151, pre-registered images are displayed in a list in the display unit 5 based on the image data registered in the image data storage 12.

At step S152, change-target image data is selected from among the displayed images by interaction with the user.

At steps S153 to S157, in the same manner as at the steps S74 to S78 in the image data registration process subroutine shown in FIG. 11, the decision as to whether to attach a keyword manually, the execution of the keyword auto-setting process, the setting of a set keyword as additional information, the decision as to whether to manually input additional information, and the execution of the additional information input process are carried out. In addition, the execution of the keyword auto-setting process is done according to the keyword auto-setting process subroutine shown in FIG. 13. In that case, the "registration-target image" becomes a "change-target image". Also, the execution of the additional information input process is done according to the additional information input process subroutine shown in FIG. 17.

At step S158, additional information of the selected image data stored in the image data storage 12 is rewritten into the set additional information. After that, the program ends the additional information changing process operation, returning to the main routine shown in FIG. 4.

In this way, the user is enabled to change a keyword attached to a pre-registered image into a more suitable keyword only by selecting the job menu "Additional information change" and specifying "Keyword auto-setting" from the input unit 1.

Figure 20:
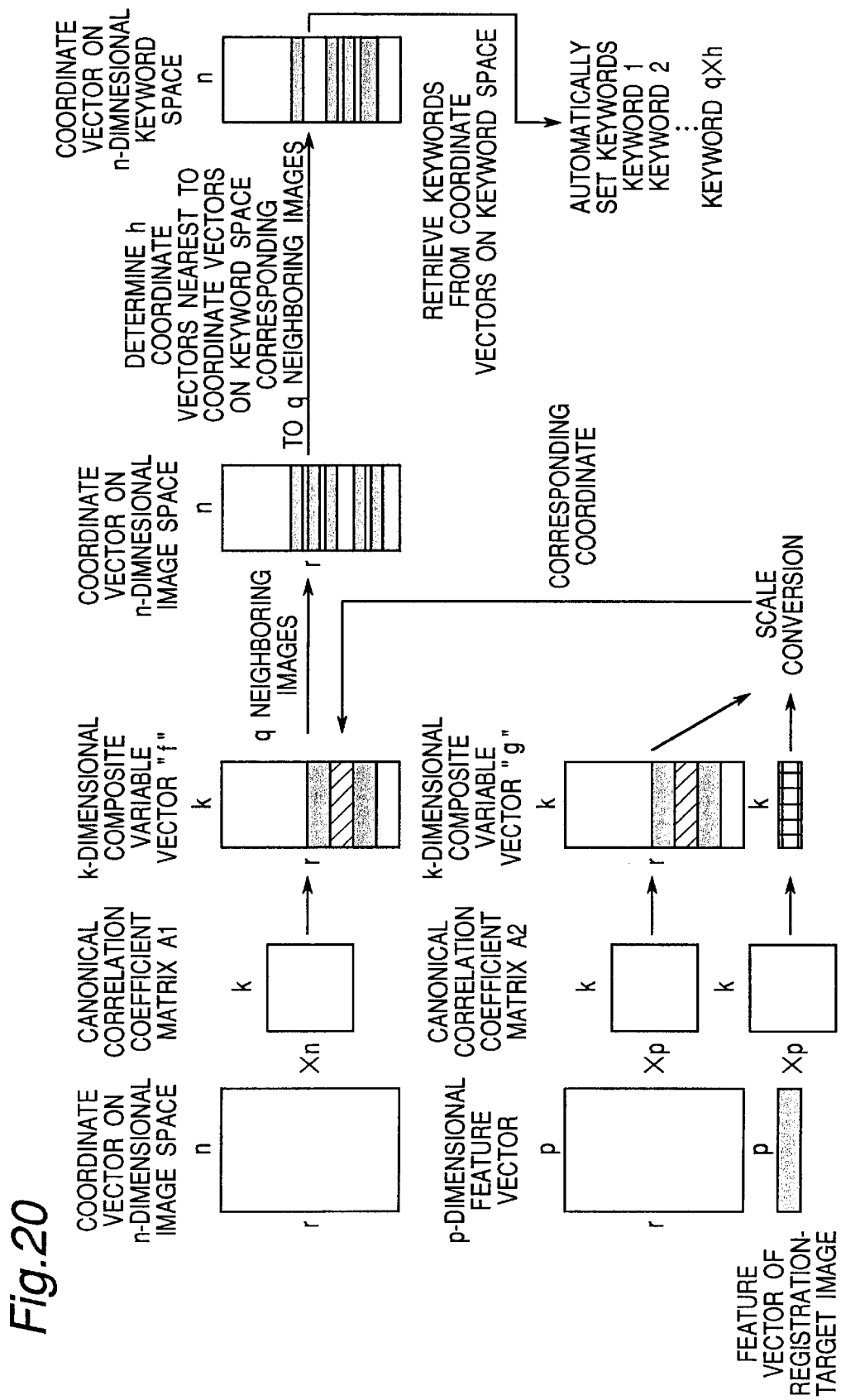
FIG. 20 is a view showing the concept of the keyword auto-setting process shown in FIG. 13.

FIG. 20 shows the concept of the keyword auto-setting process shown in FIG. 13. In the dictionary storage 8, coordinate vectors of pre-registered r images on the n-dimensional image space are stored. Also, a p-dimensional feature vector can be obtained from the feature quantities of the r images. Then, the n-dimensional coordinate vector is converted into a k-dimensional composite variable vector "f" by the canonical correlation coefficient matrix A1, while the p-dimensional feature vector is converted into a k-dimensional composite variable vector "g" by the canonical correlation coefficient matrix A2. By doing so, it becomes possible to associate the n-dimensional coordinate vector and the p-dimensional feature vector with each other on the space of the same (r×k) composite variable matrices F, G.

Meanwhile, when the p-dimensional feature vector of the registration-target image is converted into a k-dimensional composite variable vector "g" by the canonical correlation coefficient matrix A2, the position of the registration-target image on the composite variable matrix G space can be known. Then, because the n-dimensional coordinate vector and the p-dimensional feature vector can be corresponded to each other on the equal-sized spaces of the composite variable matrices F, G as described above, pre-registered q images (neighboring images) similar to the registration-target image can be obtained by making comparisons of distances between the position of the composite variable vector "g" of the registration-target image on the composite variable matrix G space and the positions of the composite variable vector "f" of the registration-target images on the composite variable matrix F space.

From this on, h (h: integer) neighboring keywords for each of the neighboring images are obtained by making comparisons of distances between the positions on the keyword space (keyword dictionary) corresponding to the positions on the image space (image dictionary) of the q neighboring images thus obtained, and the positions on the keyword space of the pre-registered keywords. In this way, q×h keywords suitably attached to the registration-target image are automatically set.

As shown above, in this embodiment, based on a plurality of exemplary images and keywords attached to the exemplary images, and with the image data of the exemplary images used as samples, an analysis by the mathematical quantification theory class III with the keyword as the category is performed by the dictionary creation processor 6. Then, from the results of this analysis, the sample score $x_i$ (n) of up to the "n"th components are normalized to a maximum value of "1" and a minimum value of "−1", while the category score $y_j^{(n)}$ is normalized to a maximum value of "1" and a minimum value of "−1". Then, coordinate vectors on the image space whose element values are the resulting normalized values of the sample score $x_i^{(n)}$ are stored in the dictionary storage 8 as an image dictionary. On the other hand, coordinate vectors on the keyword space whose element values are the normalized values of the category score $y_j^{(n)}$ are stored in the dictionary storage 8 as a keyword dictionary.

The keywords positioned on the keyword dictionary thus built up are placed on n (n: integer) meaning scales in the n-dimensional meaning space. Therefore, according to this embodiment, a keyword space can be defined and the position of one keyword on the keyword space (i.e., degrees of relevance with other keywords) can be automatically set. Thus, it is enabled to execute an ambiguous retrieval by using this degree of relevance among keywords.

As shown above, according to this embodiment, only by attaching and presenting keywords to a plurality of exemplary images, a keyword space can be automatically defined, and the degrees of relevance of one keyword with other keywords can be automatically set based on the keyword space. As a result, the user can be freed from the troublesome work that keywords are placed onto the keyword map (i.e., setting the degrees of relevance of a keyword with other keywords) as would be involved in the keyword attaching method disclosed in Japanese Patent Laid-Open Publication HEI 8-329096.

In this case, by selecting images suited to the field of use or kind of use as the exemplary images, it becomes possible to build up image dictionaries and keyword dictionaries that differ depending on the field or the use.

Also, the dictionary creation processor 6 is equipped with the axis adder 7 for setting an axis other than the automatically set n (n: integer) axes in the image dictionary or the keyword dictionary by interaction with the user. When two keywords to be placed at opposite poles are selected, this axis adder 7, using a new axis resulting from interconnecting the two selected keywords on a two-axis map that causes a largest distance between these selected keywords, projects all the registered keywords onto this axis, thus obtaining coordinates of all the keywords on the new axis.

Therefore, according to this embodiment, an axis having a new evaluation scale specified by the user can be set in the keyword space. By doing so, the user is enabled to set an axis the meaning of which is understandable for the user in addition to the n axes the meanings of which are difficult to know obtained as a result of the analysis by the mathematical quantification theory class III.

Further, the image dictionary (n-dimensional meaning space, i.e., image space) and the keyword dictionary (n-dimensional meaning space, i.e., keyword space) built up as described above have a high correlation with each other. Therefore, in the neighborhood of the coordinates on the keyword dictionary corresponding to the coordinates of one image on the image dictionary, there are placed keywords suitable for the pertinent image, and vice versa. Thus, the keyword registration processor 2 selects images suitable for the registration-target keyword from the image data storage 12 by interaction with the user, and determines average coordinates of these selected images on the image space. Then, the average coordinates on the image space are additionally registered to the keyword storage 3 and the keyword dictionary of the dictionary storage 8 together with the registration-target keyword, as the coordinates of the registration-target keyword on the keyword dictionary.

Therefore, according to this embodiment, with a simple process of only selecting an image suitable for the registration-target keyword from the pre-registered images, a new keyword can be registered together with the coordinate vector to the keyword dictionary built up with the exemplary images.

Because the image dictionary (image space) and the keyword dictionary (keyword space) are of the same n-dimensional meaning space, they have a high correlation with each other. Therefore, in the neighborhood of the position on the keyword dictionary corresponding to the position of the registration-target image on the image dictionary, there are registered keywords suitable for the registration-target image. Thus, if the position of the registration-target image on the image dictionary is known, a keyword suitable for the registration-target image can be obtained.

The vector-conversion-coefficient preparation processor 9 performs the canonical correlation analysis of the n-dimensional coordinate vector of each of the registered images read from the image dictionary and the p-dimensional feature vector of the registered image. Then, the canonical correlation coefficient matrix A1(n×k) for coordinate vector conversion and the canonical correlation coefficient matrix A2(p×k) for feature vector conversion are determined and stored into the vector conversion coefficient storage 10. Further, the n-dimensional coordinate vector of the pre-registered r images stored in the image dictionary is multiplied with the canonical correlation coefficient matrix A1(n×k) so that a k-dimensional composite variable vector "f" is obtained. Also, the p-dimensional feature vector of the pre-registered r images is multiplied with the canonical correlation coefficient matrix A2(p×k) so that a k-dimensional composite variable vector "g" is obtained. The composite variable matrix F and the composite variable matrix G obtained in this way are stored in the vector conversion coefficient storage 10. In this case, the composite variable matrix F and the composite variable matrix G have a high correlation with each other. Accordingly, it becomes possible to obtain the coordinate vector of the registration-target image on the image dictionary from the feature vector of the registration-target image.

In the keyword auto-setting processor 14, a p-dimensional feature vector is obtained by extracting feature quantities of the registration-target image or change-target image by means of the feature quantity extractor 15, and the p-dimensional feature vector is multiplied with the canonical correlation coefficient matrix A2 so as to be converted into a k-dimensional composite variable vector "g" by means of the vector converter 16, so that a scale change is achieved. Then, based on the distances between the composite variable vector "g" of the target image and the composite variable vectors "f" of the pre-registered r images stored in the vector conversion coefficient storage 10, q registered images (neighboring images) similar to the target image are obtained. Then, based on the resulting distances between the coordinate vectors on the image space (image dictionary) of the q neighboring images and the coordinate vectors on the keyword space (keyword dictionary) of the pre-registered keywords, h neighboring keywords are obtained for each of the neighboring images. Accordingly, q×h keywords suitably attached to the registration-target image or change-target image can be automatically set.

That is, according to this embodiment, the user can be freed from the troublesome work of manually attaching the keyword to the registration-target image or change-target image. Accordingly, the registration of new images or the additional information change of pre-registered images can be achieved with high efficiency.

In this case, only by attaching and presenting keywords to a plurality of exemplary images beforehand, and by automatically building up an image dictionary and a keyword dictionary and storing them into the dictionary storage 8 by means of the dictionary creation processor 6, a keyword suitable for the registration-target image or change-target image is automatically set. Accordingly, there is no need of setting and registering goodness-of-fit calculating information and threshold values, as in the keyword attaching method disclosed in Japanese Patent Laid-Open Publication HEI 6-295318.

In the keyword auto-setting processor 14 of this embodiment, when a keyword is automatically set, h near-image keywords for each neighboring image of the registration-target image or change-target image are acquired, and q×h keywords suitably attached to the registration-target image are set. However, the present invention is not limited to this, and a keyword suitable for the registration-target image or change-target image may be set in the following manner.

Figure 21:
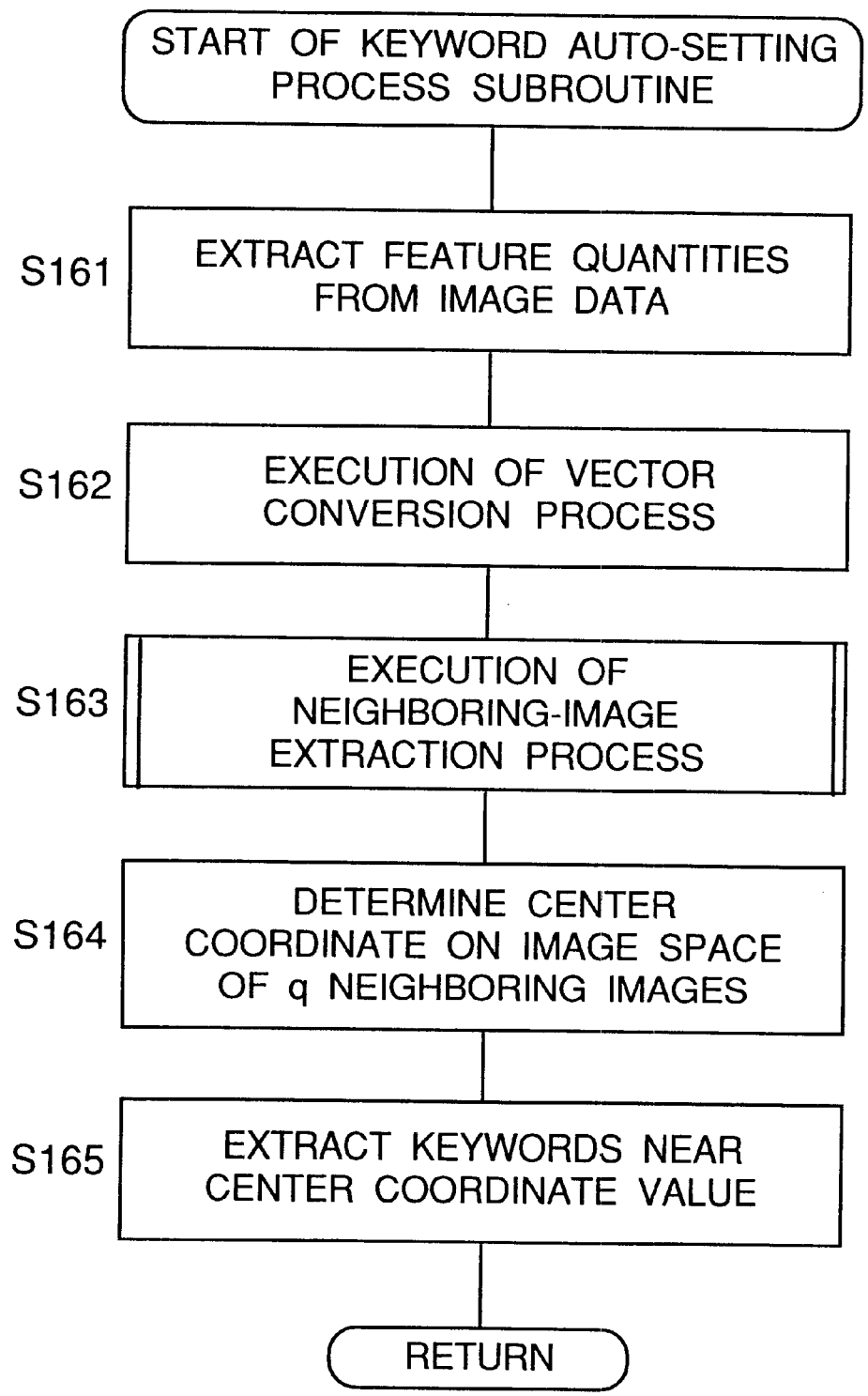
FIG. 21 is a flow chart of a keyword auto-setting process different from that of FIG. 13.

FIG. 21 is a flow chart different from that of FIG. 13 of the keyword auto-setting process subroutine to be executed at step S75 in the image data registration process subroutine shown in FIG. 11. Hereinbelow, the operation of this keyword auto-setting process is explained with reference to FIG. 1 and FIG. 21. If it is decided at step S74 of the image data registration process subroutine shown in FIG. 11 that a keyword is attached automatically, then this keyword auto-setting process subroutine starts.

At steps S161 to S163, in the same manner as at the steps S91 to S93 in the keyword auto-setting process subroutine shown in FIG. 13, the extraction of p feature quantities by the feature quantity extractor 15, the vector conversion process by the vector converter 16, and the neighboring-image extraction process are carried out. Then, neighboring images of the registration-target image or change-target image are extracted.

At step S164, based on the coordinate vectors on the dictionary space of the extracted q neighboring images, a center coordinate vector of the neighboring images on the dictionary space is determined. This center coordinate vector is a vector whose element values are the average values of the corresponding element values of the coordinate vectors of all the neighboring images.

At step S165, h' keywords near the coordinate vector on the keyword space corresponding to the center coordinate vector on the dictionary space determined at step S164 are selected and fixed as setting-use keywords. After that, the program ends the keyword auto-setting process subroutine, returning to the image data registration process subroutine shown in FIG. 11.

That is, in this embodiment, the object position calculating means is implemented by the step S162 in the keyword auto-setting process subroutine shown in FIG. 21, the keyword selecting means is implemented by the steps S163 to S165, the near-image object extracting means is implemented by the step S163, the focused position calculating means is implemented by the step S164, and the neighboring keyword extraction process is implemented by the step S165.

Figure 22:
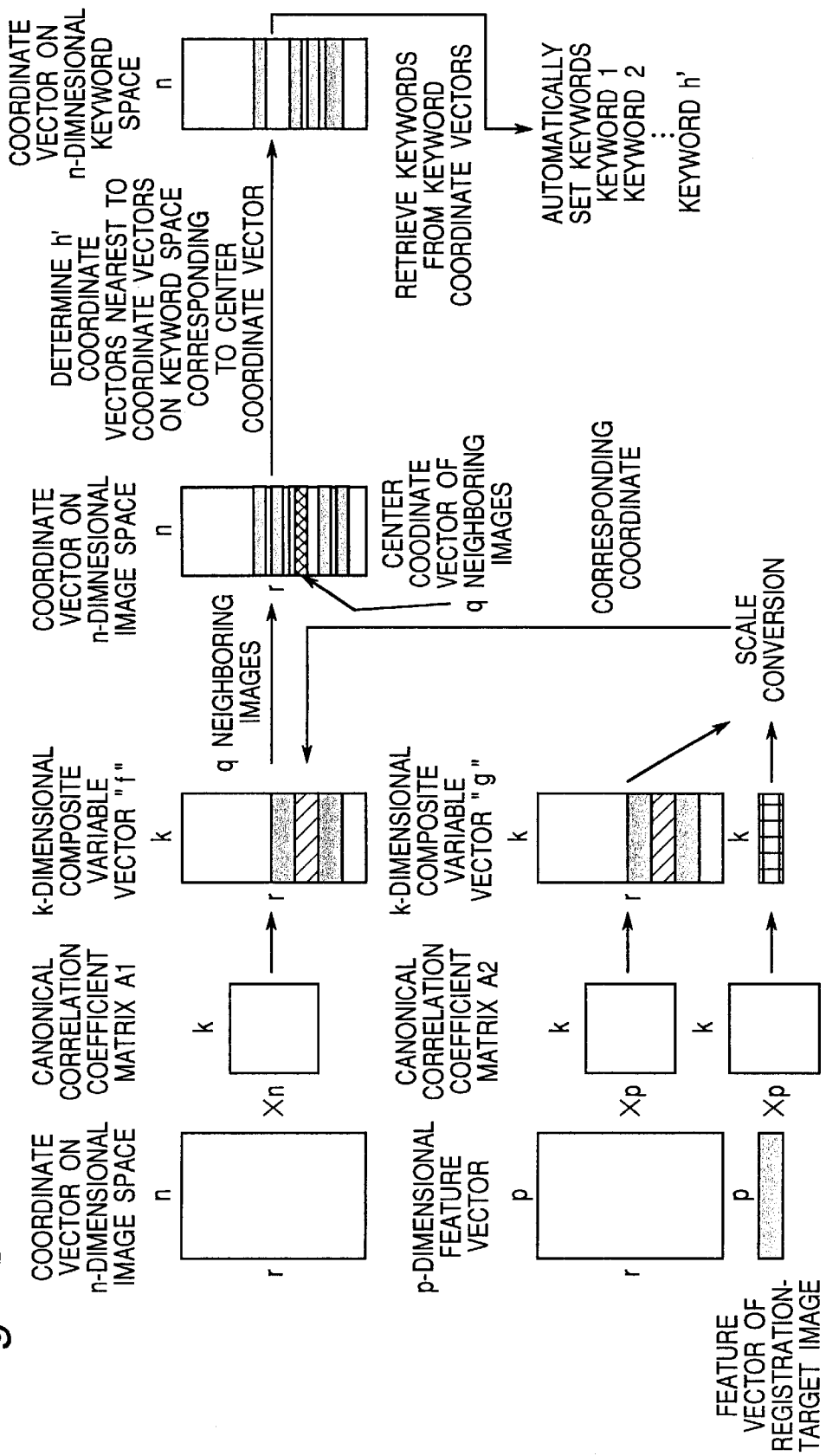
FIG. 22 is a view showing the concept of the keyword auto-setting process shown in FIG. 21.

FIG. 22 shows the concept of the keyword auto-setting process shown in FIG. 21. In this keyword auto-setting process, q registered images (neighboring images) similar to the registration-target image are obtained in the same manner as in the keyword auto-setting process shown in FIG. 13.

Then, based on the distances between the position of the key word space (keyword dictionary) corresponding to the center position on the image space (image dictionary) of the q neighboring images and the positions of pre-registered keywords on the keyword space, h' neighboring keywords of the center position are obtained. Thus, h' keywords suitably attached to the registration-target image are automatically set.

In addition, in the above-described embodiments, when coordinates on the keyword space corresponding to the composite variable vector "g" relating to the feature quantities of the registration-target image is determined, composite variable matrices G and F of the pre-registered images are utilized in the neighboring-image extraction process subroutine and the near-image keyword extraction process subroutine. However, the present invention is not limited to this. That is, for example, a correspondence between composite variable vectors relating to the feature quantities of several typical images and coordinates on the keyword space is determined beforehand by using composite variable matrices G, F of pre-registered images. Then, by using this correspondence, the coordinates on the keyword space corresponding to the composite variable vector "g" relating to the feature quantities of the registration-target image may be determined. Otherwise, a conversion matrix from the composite variable vectors relating to the feature quantities of images to the keyword space is prepared beforehand, and coordinates on the keyword space corresponding to the composite variable vector "g" relating to the feature quantities of the registration-target image may be determined by using this conversion matrix.

Further, the above embodiments have been described on a case where keywords are attached to image data. However, without being limited to this, the present invention is also applicable to cases where keywords are attached to audio data, or multimedia data in which audio data have been combined with image data. In essence, the present invention can be applied only if data allows feature quantities representing the features of the data contents to be extracted.

Furthermore, the algorithms for the dictionary creation process operation, the keyword registration process operation, the vector-conversion-coefficient preparation process operation, the image data registration process operation and the additional information changing process operation are not limited to the above-described flow charts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information processing apparatus in which an object is registered in storage with a keyword attached thereto, the apparatus comprising object space defining means for, based on a correspondence between a plurality of objects and a plurality of keywords attached to these objects, defining an object space for the plurality of objects for subsequent retrieval of the object, wherein the correspondence is obtained by mathematical quantification theory class III with each keyword used as a category and with each object used as a sample.

2. An information processing apparatus in which an object is registered in storage with a keyword attached thereto, the apparatus comprising keyword space defining means for, based on a correspondence between a plurality of objects and a plurality of keywords attached to these objects, defining a keyword space for the plurality of keywords for subsequent retrieval of the object, wherein the correspondence is obtained by mathematical quantification theory class III with each keyword used as a category and with each object used as a sample.

3. The information processing apparatus according to claim 2, further comprising object space defining means for, based on the correspondence, defining an object space for the plurality of objects, wherein the defined keyword space and object space are the same meaning space.

4. The information processing apparatus according to claim 3, further comprising keyword registering means for, based on a position of an object the position of which on the object space is known and which is corresponded to a registration-target keyword, determining the position of the registration-target keyword on the keyword space, and placing the registration-target keyword at the position on the keyword space.

5. The information processing apparatus according to claim 3, further comprising:

keyword specifying means for specifying two keywords to be positioned at opposite poles; and axis adding means for setting a new axis which interconnects the two specified keywords on the keyword space, and projecting all keywords already placed on the keyword space onto the set new axis to determine coordinates thereof on the new axis.

6. The information processing apparatus according to claim 2, further comprising:

keyword specifying means for specifying two keywords to be positioned at opposite poles; and axis adding means for setting a new axis which interconnects the two specified keywords on the keyword space, and projecting all keywords already placed on the keyword space onto the set new axis to determine coordinates thereof on the new axis.

7. A keyword auto-attaching apparatus for automatically attaching a keyword to an object to be registered in storage, comprising:

meaning space storing means in which information as to a two- or more-dimensional meaning space in which a plurality of objects and keywords attached to these objects are placed is stored;

feature quantity extracting means for extracting feature quantities of a registration-target object;

object position calculating means for, based on the feature quantities, determining a position of the registration-target object on the meaning space;

keyword selecting means for selecting keywords positioned in a neighborhood of the position of the registration-target object out of the keywords placed on the meaning space; and keyword attaching means for storing information that associates the selected keywords with the registration-target object for use in retrieving the object.

8. The keyword auto-attaching apparatus according to claim 7, further comprising correlation calculating means for performing a canonical correlation analysis on positions on the meaning space and feature quantities relating to a plurality of objects, thereby determining a correlation between positions on the meaning space and feature quantities relating to the plurality of objects, wherein the object position calculating means determines the position of the registration-target object on the meaning space based on the feature quantities of the registration-target object, by using the correlation.

9. The keyword auto-attaching apparatus according to claim 7, wherein information as to the meaning space is divisionally stored in an object-use meaning space in which the plurality of objects are placed, and a keyword-use meaning space which has the same spatial structure as the object-oriented meaning space and in which the keywords attached to the plurality of objects are placed, and wherein the keyword selecting means comprises:

neighboring object extracting means for extracting n (n: integer) objects positioned in a neighborhood of the position of the registration-target object on the object-use meaning space; and neighboring keyword extracting means for extracting keywords positioned in a neighborhood of the registration-target object based on the positions of the individual n extracted objects on the object-use meaning space, and by using the keyword-use meaning space.

10. The keyword auto-attaching apparatus according to claim 7, wherein information as to the meaning space is divisionally stored in an object-use meaning space in which the plurality of objects are placed, and a keyword-use meaning space which has the same spatial structure as the object-use meaning space and in which the keywords attached to the plurality of objects are placed, and wherein the keyword selecting means comprises:

neighboring object extracting means for extracting n objects positioned in a neighborhood of the position of the registration-target object on the object-use meaning space;

focused position calculating means for determining a focused position on the object-use meaning space based on the positions of the extracted n objects on the object-use meaning space; and neighboring keyword extracting means for extracting keywords positioned in a neighborhood of the registration-target object based on the focused positions and by using the keyword-use meaning space.

11. A keyword attaching method for automatically attaching a keyword to an object to be registered in storage, comprising preparing a two- or more-dimensional meaning space in which a plurality of objects and keywords attached to these objects are placed;

extracting feature quantities of a registration-target object;

determining a position of the registration-target object on the meaning space based on the feature quantities; and selecting a keyword positioned in a neighborhood of the position of the registration-target object and storing information that associates the keyword with the registration-target object for subsequent retrieval of said object.

12. The keyword attaching method according to claim 11, further comprising performing a canonical correlation analysis on positions on the meaning space and feature quantities relating to a plurality of objects, thereby determining a correlation between the positions on the meaning space and the feature quantities relating to the plurality of objects; and determining the position of the registration-target object on the meaning space based on the feature quantities of the registration-target object by using the correlation.

13. The keyword attaching method according to claim 11, wherein the meaning space is divisionally prepared in an object-use meaning space in which the plurality of objects are placed, and a keyword-use meaning space which has the same spatial structure as the object-use meaning space and in which the keywords attached to the plurality of objects are placed, the method further comprising;

selecting n (n: integer) objects positioned in a neighborhood of the position of the registration-target object on the object-use meaning space; and selecting a keyword positioned in a neighborhood of the registration-target object based on the positions of the individual n selected objects on the object-use meaning space and by using the keyword-use meaning space.

14. The keyword attaching method according to claim 11, wherein the meaning space is divisionally prepared in an object-use meaning space in which the plurality of objects are placed, and a keyword-use meaning space which has the same spatial structure as the object-use meaning space and in which the keywords attached to the plurality of objects are placed, the method further comprising:

selecting n objects positioned in a neighborhood of the position of the registration-target object on the object-use meaning space;

determining a focused position on the object-use meaning space based on the positions of the selected n objects on the object-use meaning space; and selecting a keyword positioned in a neighborhood of the registration-target object based on the focused positions and by using the keyword-use meaning space.

15. A computer program product in a memory which has stored therein a program for, based on a correspondence between a plurality of objects and a plurality of keywords attached to these objects, defining an object space for the plurality of objects for subsequent retrieval of at least one of the objects, wherein the correspondence is obtained by mathematical quantification theory class III with each keyword used as a category and with each object used as a sample.

16. A computer program product in a memory, comprising a program for extracting feature quantities of a registration-target object;

determining, based on the feature quantities, a position of the registration-target object on a two- or more-dimensional meaning space in which a plurality of objects and keywords attached to these objects are placed;

selecting keywords positioned in a neighborhood of the position of the registration-target object out of the keywords placed on the meaning space, and storing information associating the keywords with the registration-target object for use in retrieving the object.

17. The computer program product in a memory according to claim 16, comprising a program for performing a canonical correlation analysis on positions on the meaning space and feature quantities relating to a plurality of objects, thereby determining a correlation between positions on the meaning space and feature quantities relating to the plurality of objects; and determining the position of the registration-target object on the meaning space based on the feature quantities of the registration-target object, by using the correlation.

18. A computer program product in a memory which has stored therein a program for, based on a correspondence between a plurality of objects and a plurality of keywords attached to these objects, defining a keyword space for the plurality of keywords for subsequent retrieval of at least one of the objects, wherein the correspondence is obtained by mathematical quantification theory class III with each keyword used as a category and with each object used as a sample.

19. The computer program product in a memory according to claim 18, comprising a program stored therein for defining an object space for the plurality of objects, which is the same meaning space as the defined keyword space, based on the correspondence.

20. The computer program product in a memory according to claim 19, comprising a program stored therein for, based on a position of an object the position of which on the object space is known and which is corresponded to a registration-target keyword, determining the position of the registration-target keyword on the keyword space, and positioning the registration-target keyword at the position on the keyword space.

21. The computer program product in a memory according to claim 21, comprising a program for setting on the keyword space a new axis which interconnects two specified keywords to be positioned at opposite poles with each other, and projecting all keywords already placed on the keyword space onto the set new axis to determine coordinates thereof on the new axis.

22. The computer program product in a memory according to claim 18, comprising a program for setting on the keyword space a new axis which interconnects two specified keywords to be positioned at opposite poles with each other, and projecting all keywords already placed on the keyword space onto the set new axis to determine coordinates thereof on the new axis.

23. A method for automatically assigning keywords to data objects for using in retrieving said objects, comprising the steps of:

representing a plurality of data objects by means of respective n-dimensional object vectors in an n-dimensional space, where n>1;

representing keywords associated with said data objects by means of respective n-dimensional keyword vectors in said space;

establishing correlation between said object vectors and said keyword vectors;

receiving information pertaining to a target data object;

determining an object vector in said space for said target object on the basis of the received information;

identifying at least one object vector within said space that is a neighbor of the object vector for said target object;

selecting at least one keyword vector that correlates with said identified object vector; and storing information that associates the keyword corresponding to said selected keyword vector with said target object for use in retrieving said target object.

24. The method of claim 23, wherein the received information comprises feature quantities of said target object.

25. The method of claim 24, wherein the step of determining an object vector comprises the steps of:

representing said feature quantities as a p-dimensional feature vector;

transforming said p-dimensional feature vector into a first k-dimensional vector;

transforming said n-dimensional object vectors into second k-dimensional vectors; and comparing said first k-dimensional vector with said second k-dimensional vectors to determine similarity between them.

26. The method of claim 23, wherein said correlation is established by mathematical quantification theory class III, with each keyword designated as a category and each data object designated as a sample.

27. The method of claim 23, further including the steps of:
specifying two keywords to be positioned at opposite poles of an axis;
defining an axis that interconnects the specified keywords within said space; and
projecting the keywords represented in said space onto said axis to determine coordinates for the keywords on said axis.

28. A computer-readable medium containing a program that executes the following steps:
representing a plurality of data objects by means of respective n-dimensional object vectors in an n-dimensional space, where n>1;
representing keywords associated with said data objects by means of respective n-dimensional keyword vectors in said space;
establishing correlation between said object vectors and said keyword vectors;
receiving information pertaining to a target data object;
determining an object vector in said space for said target object on the basis of the received information;
identifying at least one object vector within said space that is a neighbor of the object vector for said target object;
selecting at least one keyword vector that correlates with said identified object vector; and
storing information that associates the keyword corresponding to said selected keyword vector with said target object for use in retrieving said target object.

29. The computer-readable medium of claim 28, wherein the received information comprises feature quantities of said target object.

30. The computer-readable medium of claim 29, wherein said program executes the following steps to determine the object vector for said target object:
representing said feature quantities as a p-dimensional feature vector;
transforming said p-dimensional feature vector into a first k-dimensional vector;
transforming said n-dimensional object vectors into second k-dimensional vectors; and
comparing said first k-dimensional vector with said second k-dimensional vectors to determine similarity between them.

31. The computer-readable medium of claim 28, wherein said correlation is established by mathematical quantification theory class III, with each keyword designated as a category and each data object designated as a sample.

32. The computer-readable medium of claim 28, wherein said program executes the following further steps:
receiving two keywords to be positioned at opposite poles of an axis;
defining an axis that interconnects the received keywords within said space; and
projecting the keywords represented in said space onto said axis to determine coordinates for the keywords on said axis.

* * * * *